United States Patent
Su et al.

(10) Patent No.: US 8,223,100 B2
(45) Date of Patent: Jul. 17, 2012

(54) PIXEL STRUCTURE AND FORMING METHOD AND DRIVING METHOD THEREOF

(75) Inventors: Jenn-Jia Su, Hsinchu (TW); Ming-Feng Tien, Hsinchu (TW); Chia-Jung Yang, Hsinchu (TW); Ting-Jui Chang, Hsinchu (TW); Po-Lun Chen, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 987 days.

(21) Appl. No.: 12/203,291

(22) Filed: Sep. 3, 2008

(65) Prior Publication Data
US 2009/0066626 A1  Mar. 12, 2009

(30) Foreign Application Priority Data
Sep. 6, 2007  (TW) .............................. 96133206 A

(51) Int. Cl.
*G09G 3/36* (2006.01)
(52) U.S. Cl. .......................................... 345/92; 349/139
(58) Field of Classification Search ............ 345/87–104; 349/84, 139–152
See application file for complete search history.

(56) References Cited

U.S. PATENT DOCUMENTS

| | | |
|---|---|---|
| 6,407,791 B1 | 6/2002 | Suzuki et al. |
| 6,466,293 B1 | 10/2002 | Suzuki et al. |
| 6,515,719 B2 | 2/2003 | Yamaguchi et al. |
| 6,765,562 B2 * | 7/2004 | Yamazaki et al. ............ 345/206 |
| 2001/0020991 A1 * | 9/2001 | Kubo et al. .................... 349/113 |
| 2002/0018035 A1 * | 2/2002 | Song et al. ...................... 345/87 |
| 2002/0019813 A1 | 2/2002 | Furuya |
| 2003/0112397 A1 | 6/2003 | Lee |
| 2004/0046914 A1 | 3/2004 | Hirota |
| 2004/0135147 A1 | 7/2004 | Kim et al. |
| 2006/0274008 A1 * | 12/2006 | Lin et al. ......................... 345/92 |

FOREIGN PATENT DOCUMENTS

TW  200603059  1/2006

OTHER PUBLICATIONS

Taiwanese language office action dated Feb. 22, 2012.
English language translation of abstract of TW 200603059.

* cited by examiner

*Primary Examiner* — Stephen Sherman
(74) *Attorney, Agent, or Firm* — Thomas|Kayden

(57) ABSTRACT

A pixel structure, disposed on a first substrate, and electrically coupled to at least one scan line and at least one data line is provided. The pixel structure includes a first switch device, a second switch device, at least one pixel electrode, at least one control electrode, and at least one coupling electrode. The first switch device is electrically coupled to the scan line and the data line. The second switch device is electrically coupled to the scan line and the data line. The pixel electrode is electrically coupled to the second switch device. The control electrode is electrically coupled to the first switch element. The coupling electrode is disposed under the control electrode.

42 Claims, 45 Drawing Sheets

BM

PIXEL STRUCTURE AND FORMING METHOD AND DRIVING METHOD THEREOF

CROSS REFERENCE TO RELATED APPLICATIONS

This application claims the benefit of Taiwan Application No. 096133206, filed on Sep. 6, 2007, the contents of which are incorporated by reference in its entirety.

BACKGROUND OF THE INVENTION

1. Field of the Invention

The present invention relates to pixel structures and, more particularly, to pixel structures of liquid crystal display (LCD) devices.

2. Description of the Related Art

FIG. 1A, FIG. 1B, and FIG. 1C are cross sections of pixel structures of a vertical alignment (VA) mode, a multi-domain vertical alignment (MVA) mode, and patterned vertical alignment (PVA) mode, respectively. Generally, concerning the vertical alignment (VA) mode, a lower substrate 10 includes a transparent electrode 11 (e.g., indium tin oxide (ITO)) with a slits SL design such that rotation of the liquid crystal (LC) molecules is consistent with distribution of the electric field E generated therefrom. Regarding the multi-domain vertical alignment (MVA) mode, distribution of electrical field is generated between protrusions 15 on the upper substrate 13 and the slits SL of the transparent electrode 11 (e.g., indium tin oxide (ITO)) on the lower substrate 10 to drive liquid crystal (LC) molecule rotation. As for the patterned vertical alignment (PVA) mode, distribution of the electrical field is generated from patterned slits SL of the transparent electrode 11 (e.g., indium tin oxide (ITO)) on both the upper and lower substrate to drive liquid crystal (LC) molecule rotation. FIG. 2A and FIG. 2B are simulated LC distribution diagrams of the VA mode and MVA mode, respectively, after applying voltage of 20 ms. Generally, response of the VA mode is slow, particularly at the central region of the electrodes, as shown in FIG. 2A. After the electrodes are applied a voltage, LC molecules begin to tilt from the slits SL of the transparent electrode 21 (e.g., indium tin oxide (ITO)) on the lower substrate 20. The LC molecules at the central region do not tilt at 20 ms, and completely tilt (not shown) following 40 ms. The LC molecules of the MVA mode have a pre-tilt angle due to protrusions 25 on the upper substrate 23. Therefore, the LC molecules at the entire region is completely tilted down after a 20 ms response time, as shown in FIG. 2B. When compared to the conventional VA mode, the MVA mode and PVA mode have the following drawbacks: First, an additional process step is needed on the upper substrate. The MVA mode requires an additional process step to create protrusions. The PVA mode requires an additional process step to create the slits SL of the transparent electrode 21 (e.g., indium tin oxide (ITO)). Second, since protrusions on the upper substrate of the MVA mode result in a pre-tilt angle of the LC molecules, light leakage during the dark state can occur at this region. Third, since the PVA mode does not have a pre-tilt angle, LC response is slower than the MVA mode. Fourth, since the MVA mode and the PVA mode require configuration between the upper and lower substrates to create an ideal electrical field distribution, fabrication processes are more stringent, and alignment between the upper and lower substrates must be done precisely. If not done the above-mentioned processes and/or alignment requested, the response at the left and right regions of a pixel can be inconsistent, further resulting in response delay of the entire display panel and simultaneously creating an additional disclination line, thus reducing transparency.

According to the abovementioned problems, a technique of forming a control electrode CE and is directly formed on the lower substrate is proposed to create an electrical field, tilting LC molecules, as shown in FIG. 3. Meanwhile, driving methods can be primarily divided into the following three categories.

The first driving method is direct driving methods which are disclosed in U.S. Pat. No. 6,407,791, U.S. Pub. No. 2003/0112397, and U.S. Pub. No. 2004/0046914, the entirety of which is hereby incorporated by reference. A voltage is directly applied to the control electrode CE of the lower substrate, the control electrode CE is directly formed on the lower substrate. Since the LCD panel is driven line-by line downwardly and positive and negative half-periodically switched, the voltage of the control electrode is changed as the pixel electrode is driven. Thus, an additional set of integrated circuits, is needed to drive the control electrode and to transform the voltage to synchronize with the scan lines, as shown in FIG. 4, wherein reference 21 denotes potential of the common electrode, reference 22 denotes image signal of odd rows, reference 23 denotes the signal of the $n^{th}$ column scan line, reference 24 denotes the signal of the $n+1^{th}$ column scan line, reference 25 denotes the signal of the control electrode above the $n^{th}$ column, reference 26 denotes the signal of the control electrode under the $n^{th}$ column, reference 27 denotes the signal of the control electrode above the $n+1^{th}$ column, and reference 26 denotes the signal of the control electrode under the $n^{th}$ column. The drawbacks of this driving method are: first, an additional set of driving integrated circuit is needed resulting in higher production costs; and second, the driving integrated circuit of the conventional LCD panel does not support this driving method.

The second driving method is disclosed in U.S. Pat. Nos. 6,466,293 and 6,515,719, U.S. Pub. Nos. 2002/0019813 and 2004/0135147, the entirety of which is hereby incorporated by reference. The device is described as the followings. Data lines DL and scan lines SL, respectively, represent conductive lines for driving signals on the thin film transistor TFT. Common electrode lines COM represent conductive lines providing a common voltage Vcom. This type of driving method allows the pixel electrode to be at a floating state. The voltage of the pixel electrode PE is controlled by capacitance coupling with the control electrode CE, as shown in FIG. 5A and FIG. 5B. When a voltage $V_{DE}$ is applied on the control electrode CE to induce a control electrode voltage $V_{CE}$, the potential Vp of the pixel electrode is coupled to a lower potential by the capacitor Cc (which is consisted of a control electrode CE and a pixel electrode PE). The voltage relationship is expressed as $$Vp = V_{DE} \times \frac{Cc}{Cc + C_{LC}}.$$

However, this driving method has the following problems. First, the pixel electrode is under a floating state, so static charges are prone to accumulate on the electrode without drainage paths, thereby resulting in image sticking. Second, since the pixel electrode voltage is generated by coupling capacitance Cc, the voltage on the pixel electrode is lower the conventional driving voltage of the pixel electrode, resulting in deteriorated transparency. To improve this phenomenon, the driving voltage value on the data lines has to increase.

Namely, the driving integrated circuit has to adopt a high amplitude voltage (such as increasing driving voltage from 5V to 7V). This kind of driving integrated circuit is difficult to fabricate and has higher power consumption.

The third type of driving method is disclosed in U.S. Pub. Nos. 2004/0046914 and 2004/0135147, the entirety of which is hereby incorporated by reference. Several thin film transistors (TFT) are used to drive voltage on each control electrode and pixel electrode, respectively, at different time periods. The equivalent circuit of this driving method is shown in FIG. 6 which is described as follows. $V_{CE}$ and Vp, respectively, represent the voltage on the control electrode and the pixel electrode. The scan line n and the data line n, respectively, represent the scan and data lines for driving the pixel electrode. The scan line n−1 represents the scan line for controlling the upper last pixel electrode. The data line n-1 represents data line for the left pixel electrode. Under a dot inversion driving condition, the polarities of the driving voltages on both the left and right sides and both the upper and lower sides are inverted. When the last scan line n−1 is switched on, transistors $TFT_2$ and $TFT_3$ are also switched on and positive polarity of voltage Vd2 and negative polarity of voltage Vd3 are respectively applied on the control electrode $V_{CE}$ and the pixel electrode Vp. When the last scan line n−1 is switched off, transistors $TFT_2$ and $TFT_3$ are also switched off and the voltage on the control electrode $V_{CE}$ is Vd2 and the voltage on the pixel electrode Vp is Vd3. When the scan line n is switched on, transistor $TFT_1$ is also switched on, and the voltage on the pixel electrode is raised from −Vd3 to +Vd1, while the voltage on the control electrode is raised by the coupling capacitance Cc to the product of Vd2 plus (Vd1−(−Vd3)) and the value of capacitance coupling. This driving method has the following problems. First, voltage $V_{CE}$ is determined by signals Vd2 and Vd3 of the last frame. While voltage $V_{CE}$ can affect the brightness of the pixel, the upper last and lower next pixel are affected by each other. Second, there are too many thin film transistors in a single pixel, thereby increasing production complexity.

BRIEF SUMMARY OF THE INVENTION

According to an embodiment of the present invention, a pixel structure, disposed on a first substrate and electrically coupled to at least one scan line and at least one data line, the pixel structure comprises: a first switch device electrically coupled to the scan line and the data line; a second switch device electrically coupled to the scan line and the data line; at least one pixel electrode electrically coupled to the second switch device; at least one control electrode electrically coupled to the first switch element; and at least one coupling electrode disposed under a portion of the control electrode.

According to another embodiment of the present invention, a method for forming a pixel structure, the pixel structure disposed on a first substrate and electrically coupled to at least one scan line and at least one data line, the method comprises: forming a first switch device in the pixel structure electrically coupling to the scan line and the data line; forming a second switch device in the pixel structure electrically coupling to the scan line and the data line; forming at least one pixel electrode in the pixel structure electrically coupling to the second switch device; forming at least one control electrode in the pixel structure electrically coupling to the first switch element; and forming at least one coupling electrode disposed under a portion of the control electrode.

According to still another embodiment of the present invention, a method for driving a pixel structure, the pixel structure disposed on a first substrate and electrically coupled to at least one scan line and at least one data line, and the pixel structure having a first switch device, a second switch device, at least one pixel electrode, at least one control electrode, and at least one coupling electrode, the method comprises: providing a voltage corresponding to a displaying data to the pixel electrode and the control electrode, such that the pixel and the control electrode are at a floating connection state; providing a first coupling voltage to the coupling electrode; and coupling a variation of the first coupling voltage to the control electrode via at least one coupling capacitor, such that an absolute value of a voltage difference between the control electrode and a common electrode substantially greater than an absolute value of a voltage difference between the pixel electrode and the common electrode, wherein the common electrode is disposed on a second substrate and the second substrate is corresponding to the first substrate.

The present invention provides a pixel structure configured with a driving design to stably drive voltage on the control electrode such that an absolute value of voltage difference between the control electrode and the common electrode of the upper substrate substantially greater than an absolute value of voltage difference between the pixel electrode and the common electrode of the upper substrate.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
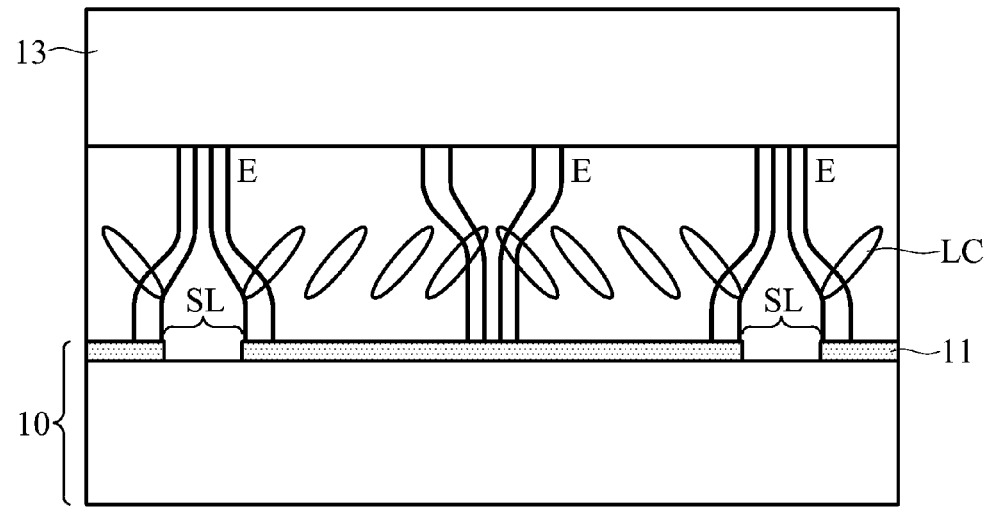
FIG. 1A, FIG. 1B, and FIG. 1C are cross sections of pixel structures of a vertical alignment (VA) mode, a multi-domain vertical alignment (MVA) mode, and patterned vertical alignment (PVA) mode, respectively.
Figure 1B:
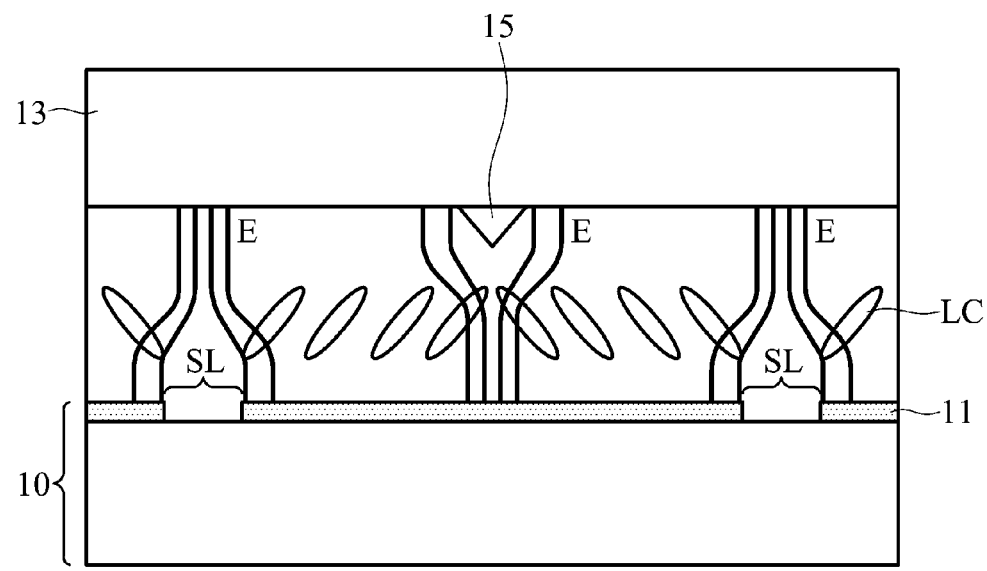
Figure 1C:
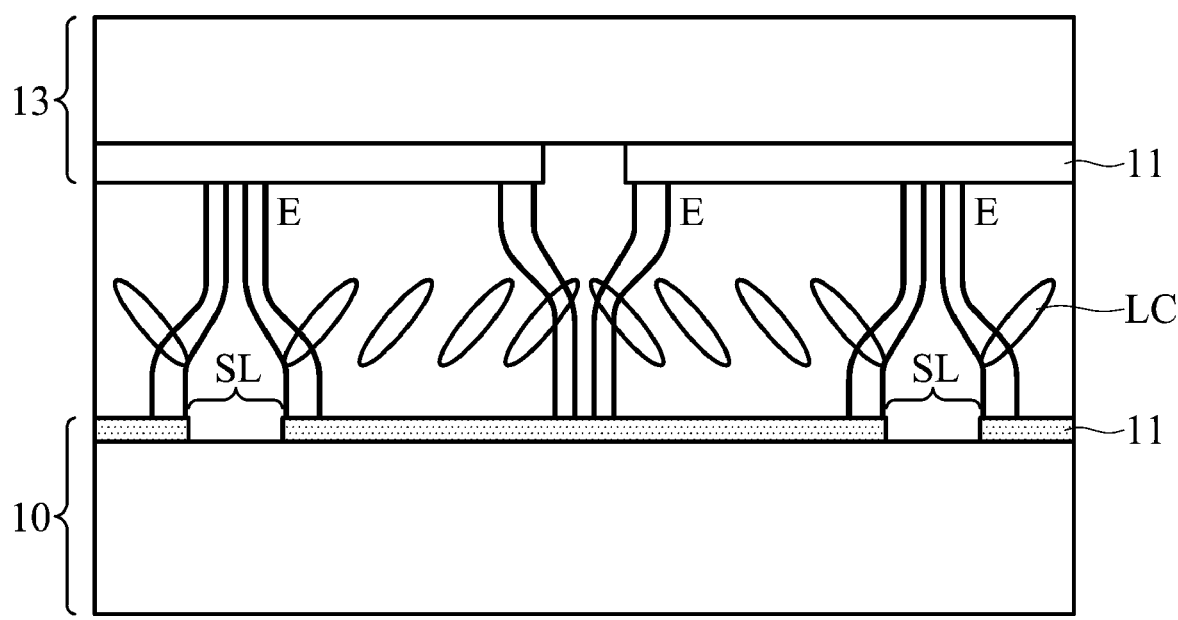
Figure 2A:
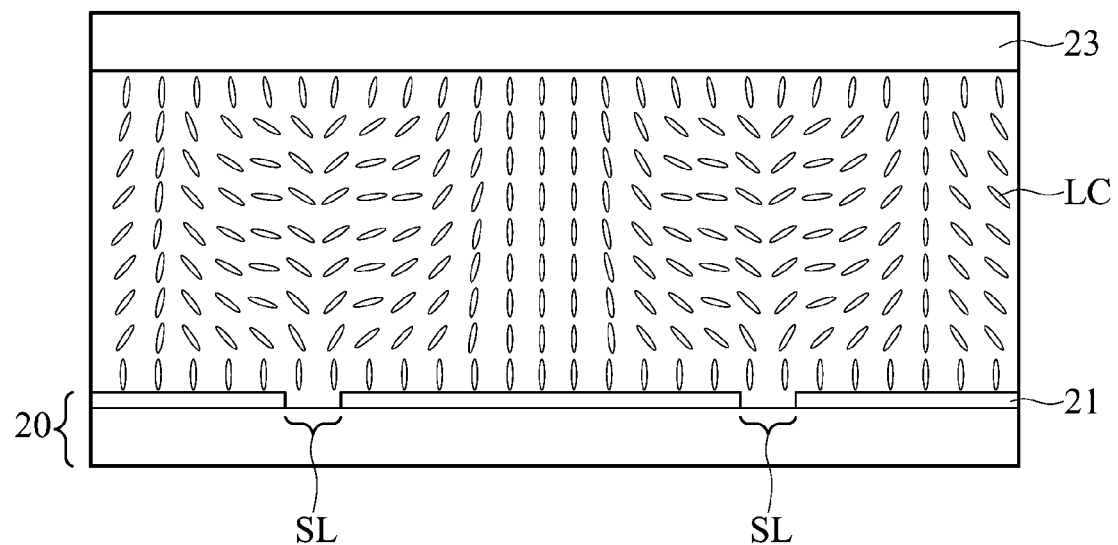
FIG. 2A and FIG. 2B are simulated LC distribution diagrams of the VA mode and MVA mode, respectively.
Figure 2B:
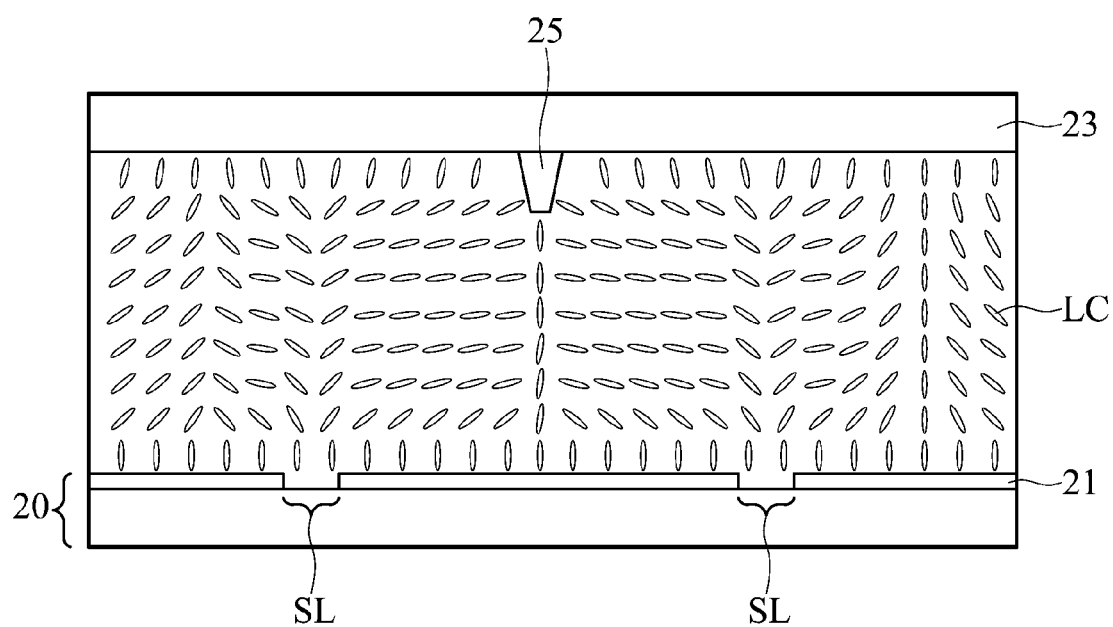
Figure 3:
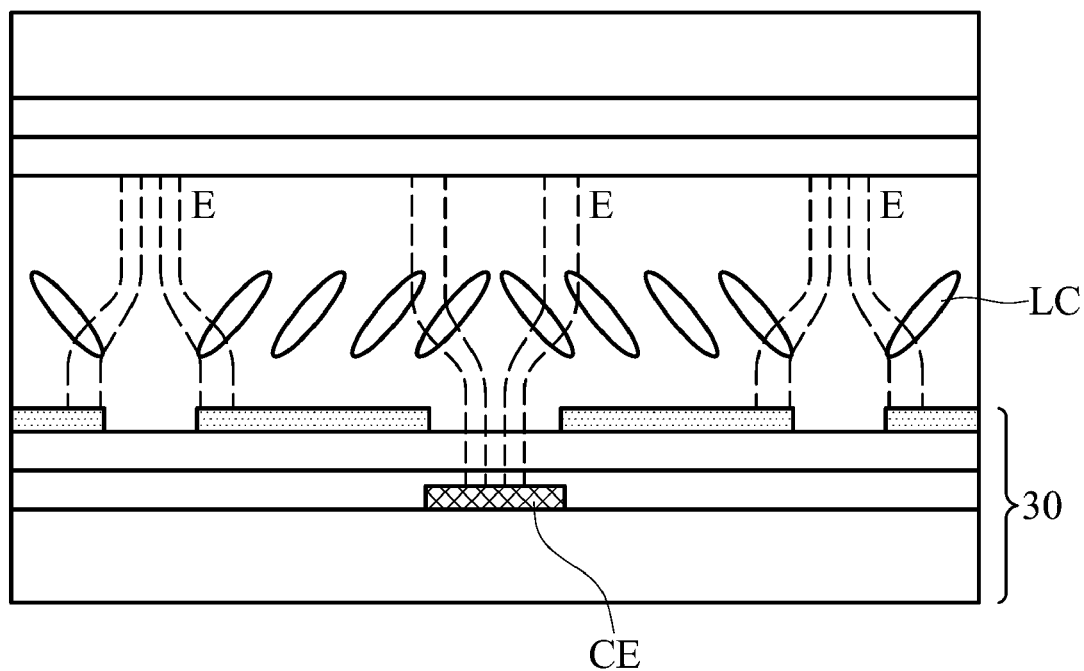
FIG. 3 is a schematic view illustrating liquid crystal molecules rotations conventionally controlled by a control electrode.
Figure 4:
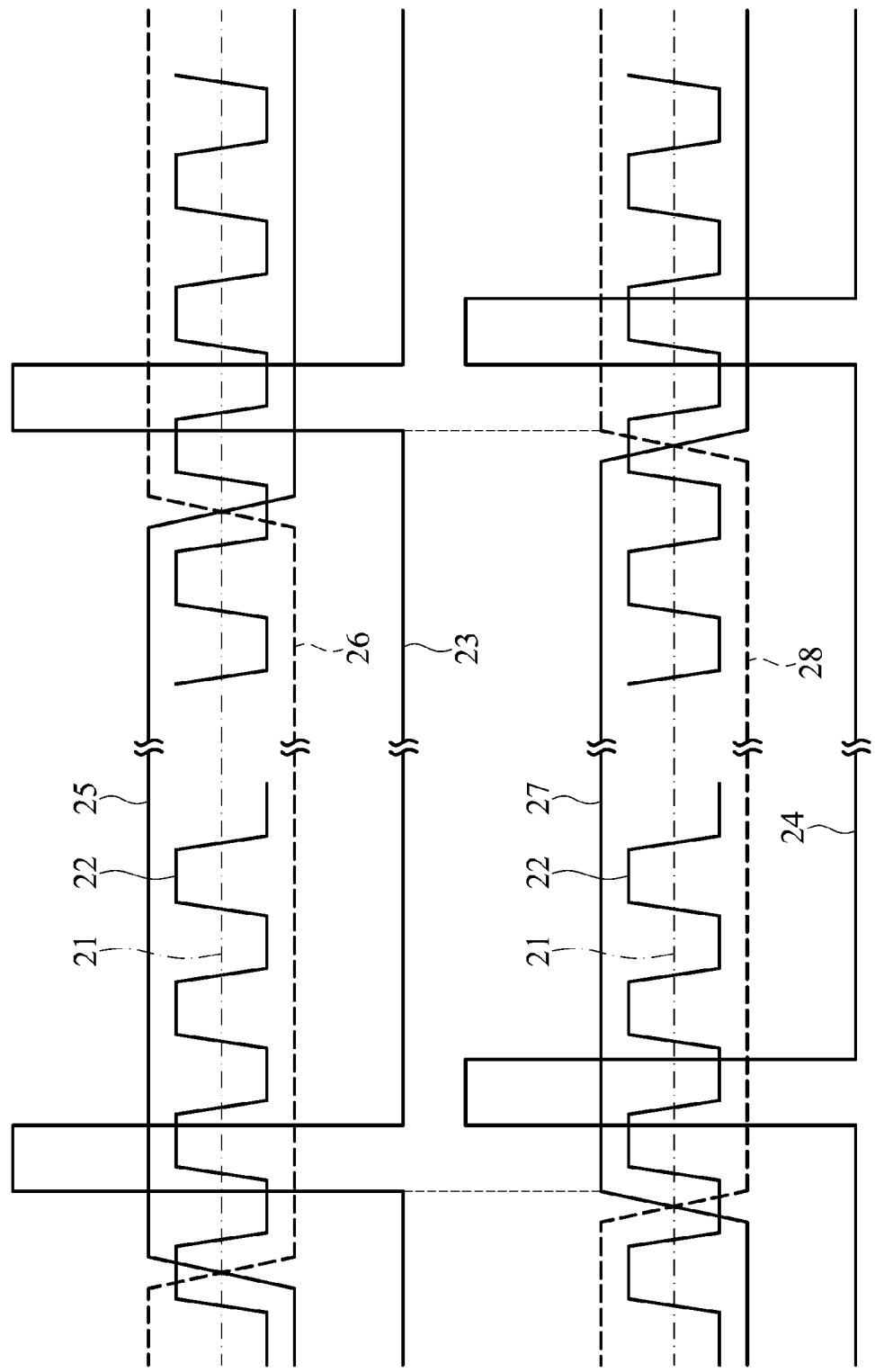
FIG. 4 is a diagrams of signal waveforms directly driven by the conventional control electrode.
Figure 5A:
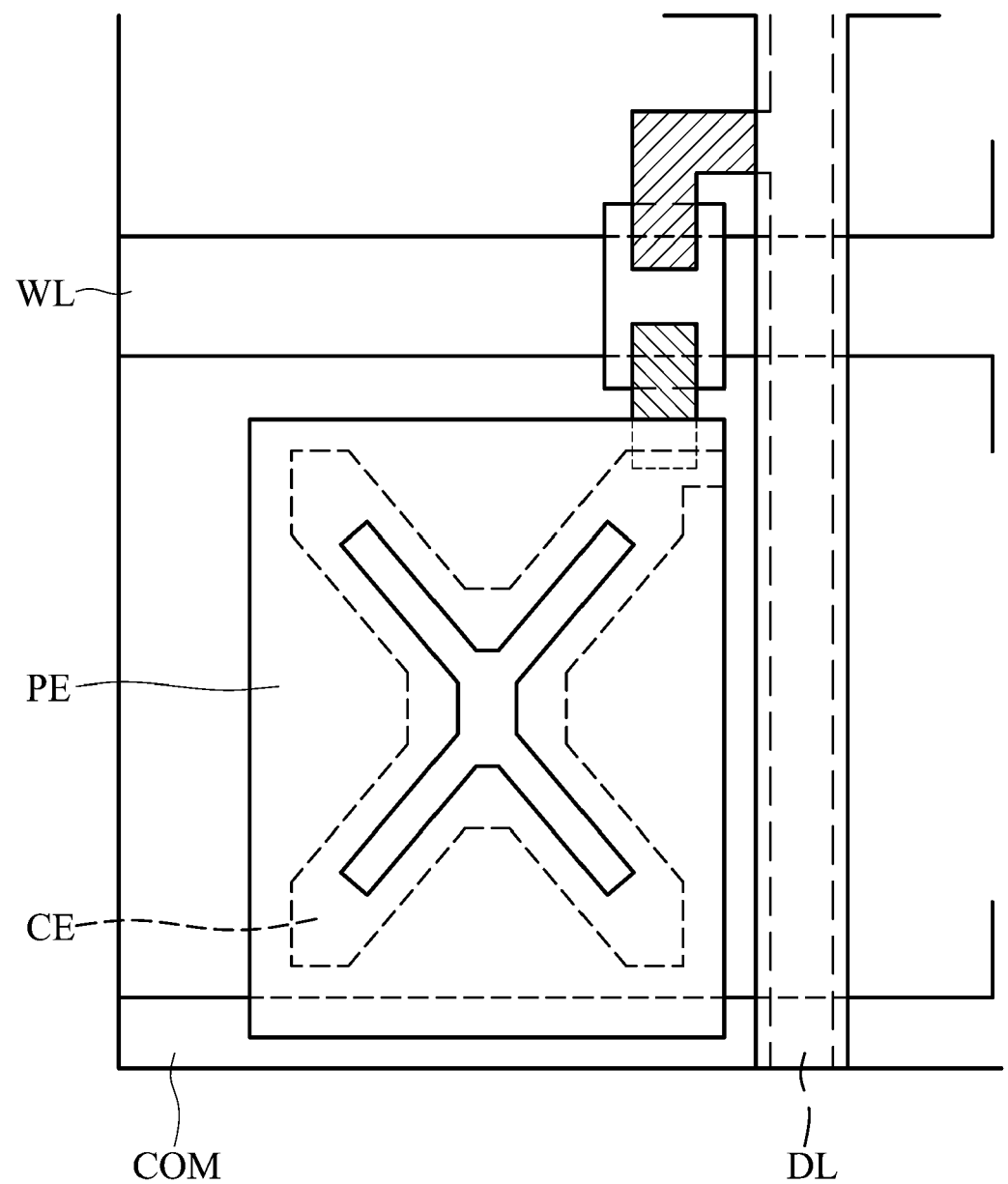
FIGS. 5A and 5B are schematic views of conventionally driving a pixel electrode by a coupling capacitor.
Figure 5B:
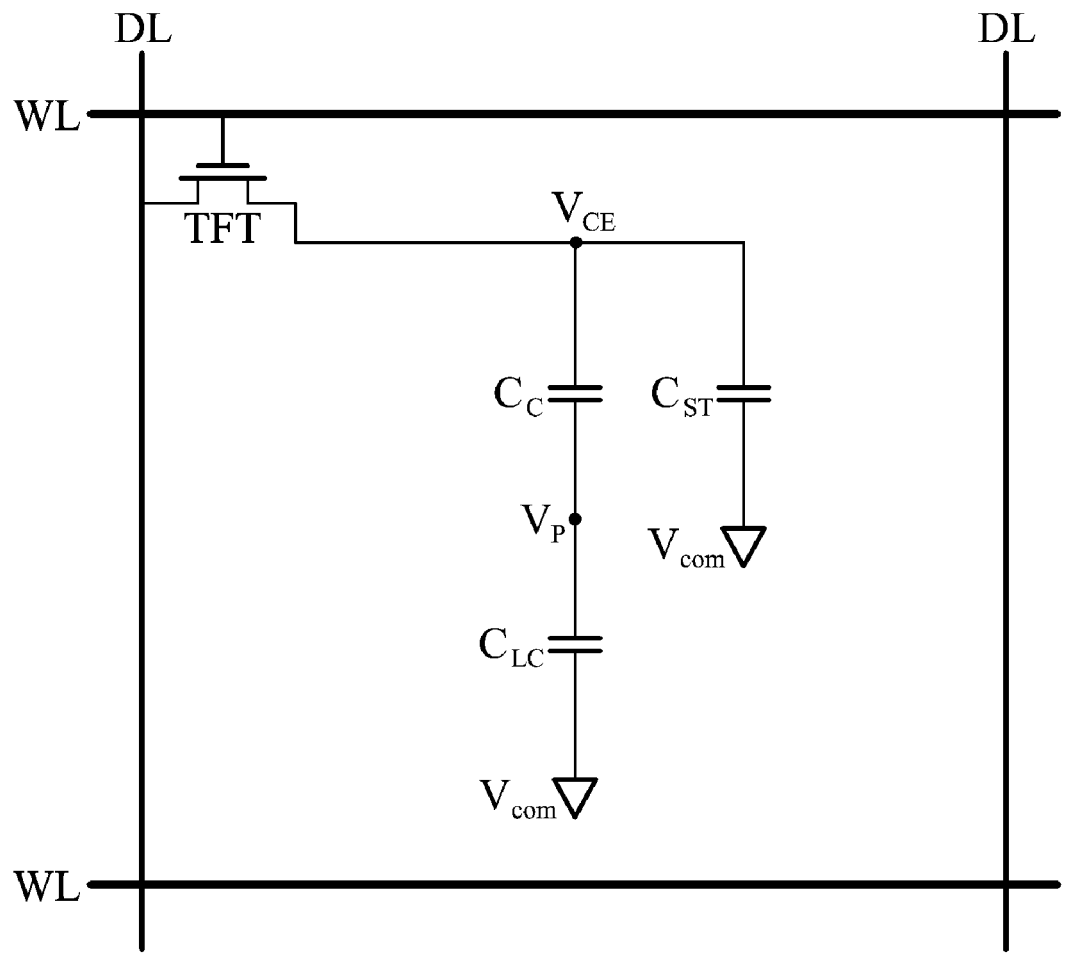
Figure 6:
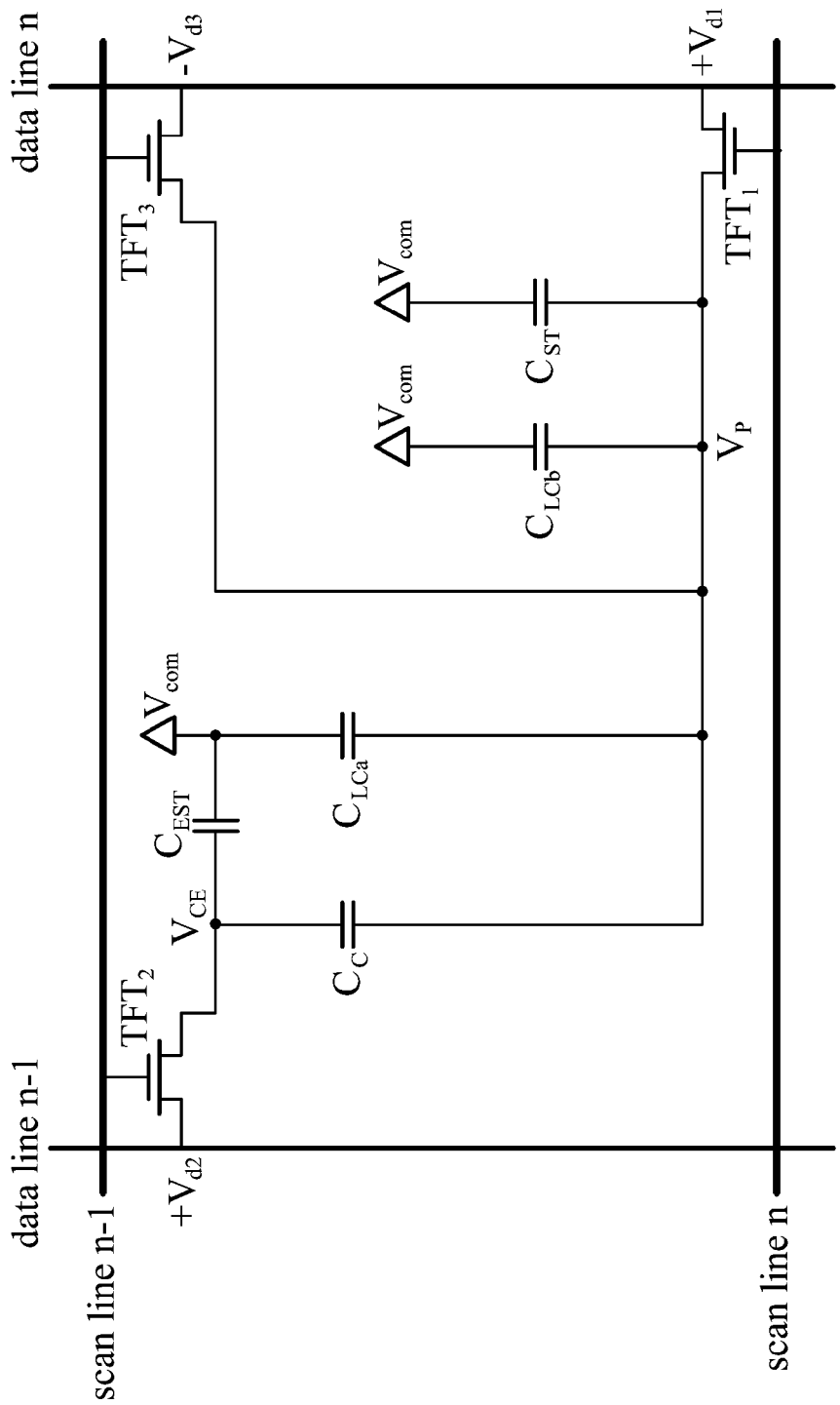
FIG. 6 is a equivalent circuit diagram of controlling a driving electrode using pluralities of transistors.

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed. Moreover, the formation of a first feature over or on a second feature in the description that follows may include embodiments in which the first and second features are formed in direct contact or not in direct contact.

Figure 7:
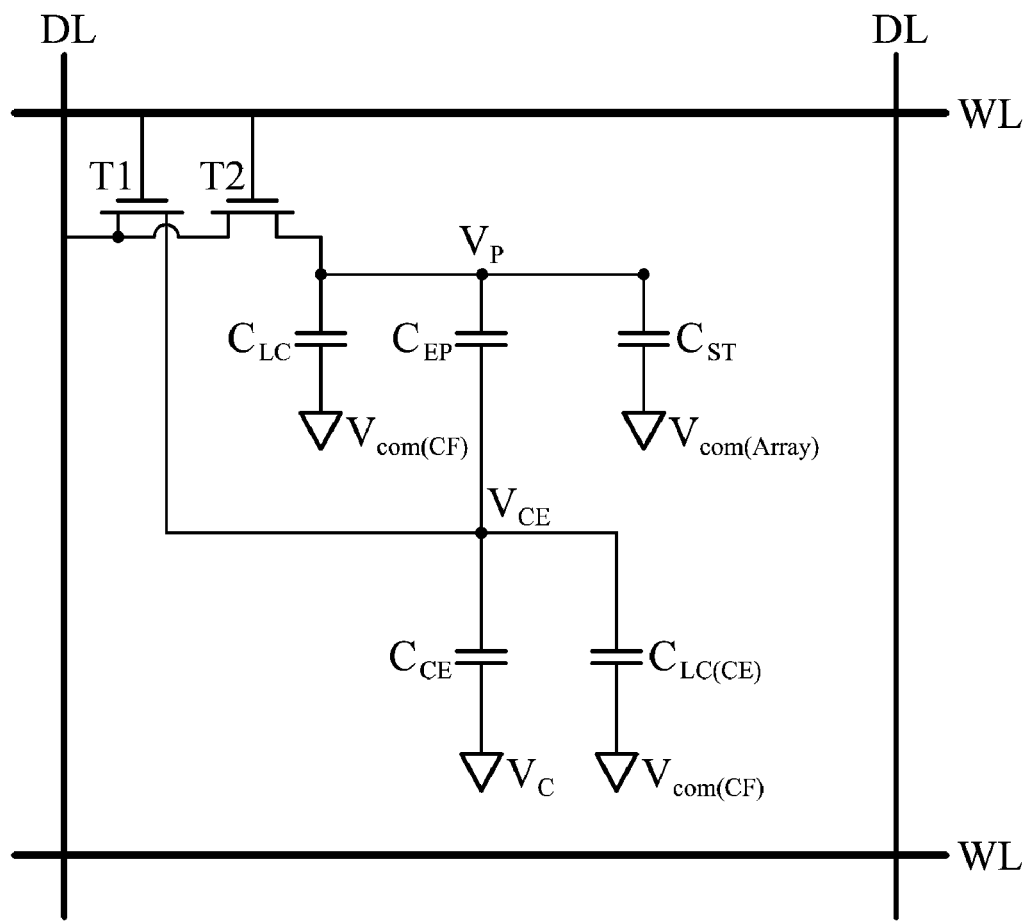
FIG. 7 is a schematic view of an embodiment of the pixel driving circuit of the present invention.

FIG. 7 is a circuit diagram for driving a pixel according to an embodiment of the present invention. The circuit diagram for driving a pixel includes a first transistor T1, a second transistor T2, a coupling electrode $V_C$, a first coupling capacitor $C_{CE}$, and a second coupling capacitor $C_{EP}$. The first transistor T1 includes a gate coupled to a scan line WL, a source coupled to a data line DL, and a drain coupled to a control electrode $V_{CE}$. The second transistor T2 includes a gate coupled to a scan line WL and source of the first transistor T1, a source coupled to a data line DL, and a drain coupled to a pixel electrode Vp. The first coupling capacitor $C_{CE}$ is coupled between the control electrode $V_{CE}$ and the coupling electrode $V_C$. The second coupling capacitor $C_{EP}$ is coupled between the control electrode $V_{CE}$ and the pixel electrode Vp. When the scan line WL is driven to a high level by an integrated circuit, the first transistor T1 and the second transistor T2 are turned on and signals on the data line DL will transfer to the pixel electrode Vp and the control electrode $V_{CE}$. When the first transistor T1 and the second transistor T2 are turned off, the voltage on the coupling electrode $V_C$ is coupled to the control electrode $V_{CE}$ via the first coupling capacitor $C_{CE}$. Therefore, the voltage on the control electrode $V_{CE}$ is some changed, such that an absolute value of voltage difference between the control electrode $V_{CE}$ and the common electrode Vcom(CF) of the upper substrate substantially greater than an absolute value of voltage difference between the pixel electrode Vp and the common electrode Vcom(CF) of the upper substrate.

In the circuit diagram of FIG. 7, the relationship among the control electrode $V_{CE}$, the pixel electrode Vp, and the common electrode can be shown as follows:

$$V_{CE(RMS)} = Vp + \Delta V_{CE(RMS)},$$

$$Vp' = Vp + \Delta V_{P(RMS)},$$

$$\Delta V_{C1} = V_{C1(max)} - V_{C1(min)},$$

$$\Delta V_{CE(RMS)} = \frac{\Delta V_{P(RMS)} \times C_{EP} + \Delta V_{C1} \times C_{CE}}{C_{CE} + C_{LC(CE)} + C_{EP} // C_{LC}}, \text{ and}$$

$$\Delta V_{P(RMS)} = \frac{\Delta V_{CE} \times C_{EP}}{C_{LC} + (C_{EP} // (C_{CE} + C_{LC(CE)}))}.$$

Figure 8A:
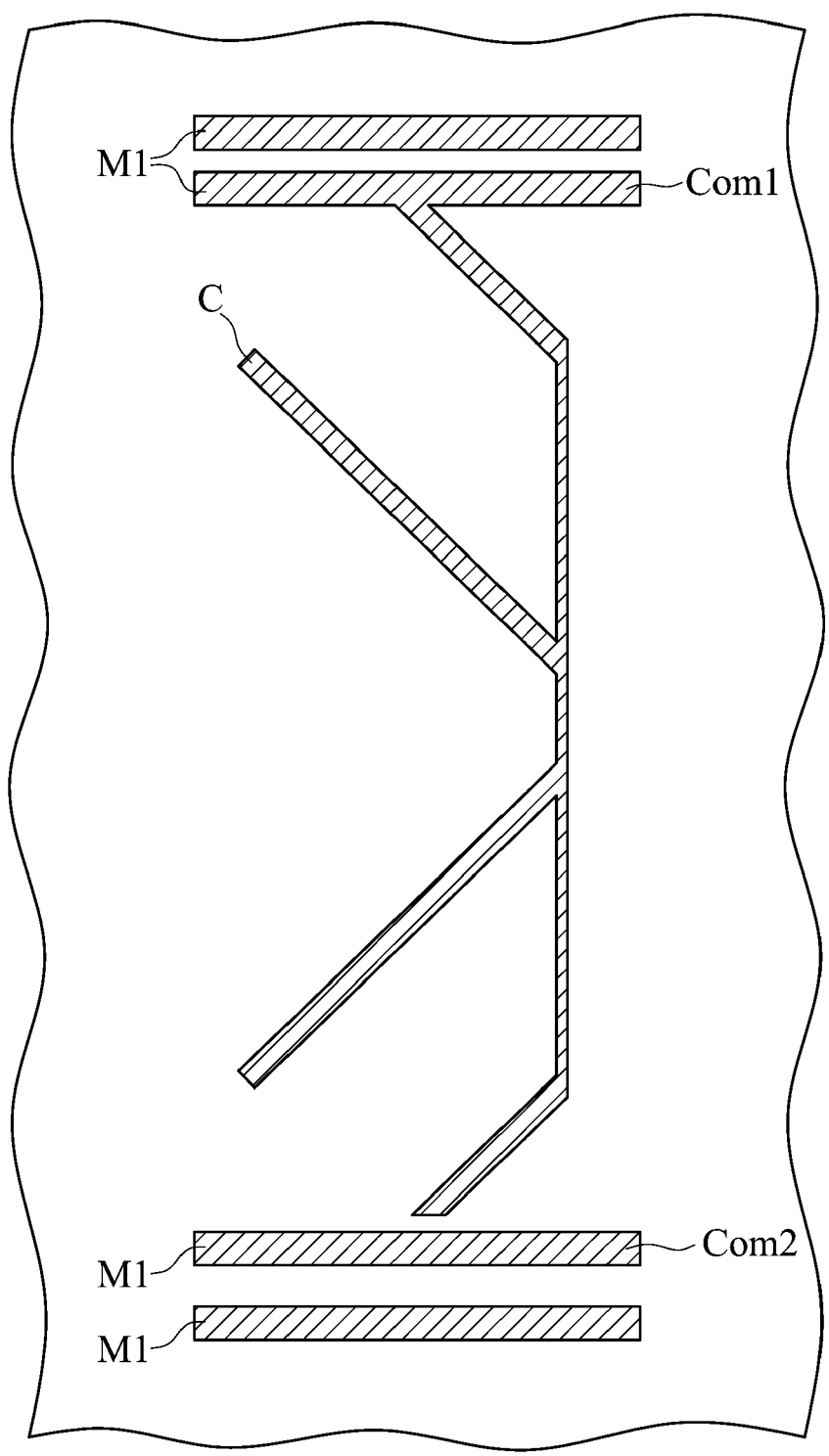
FIGS. 8A to 8E are layouts of photo-masks compatible with current thin film transistor fabrication processes.
Figure 8B:
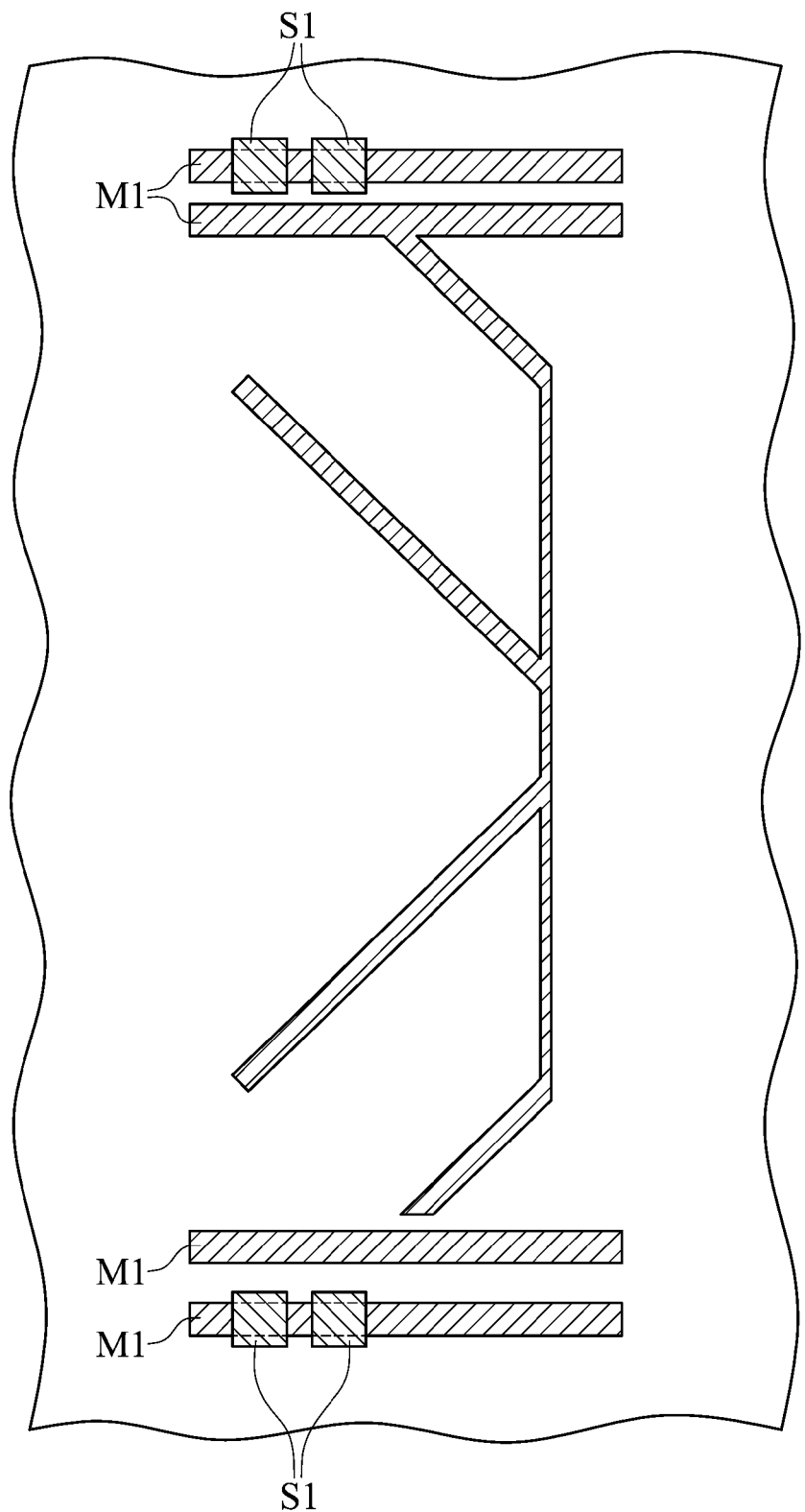
Figure 8C:
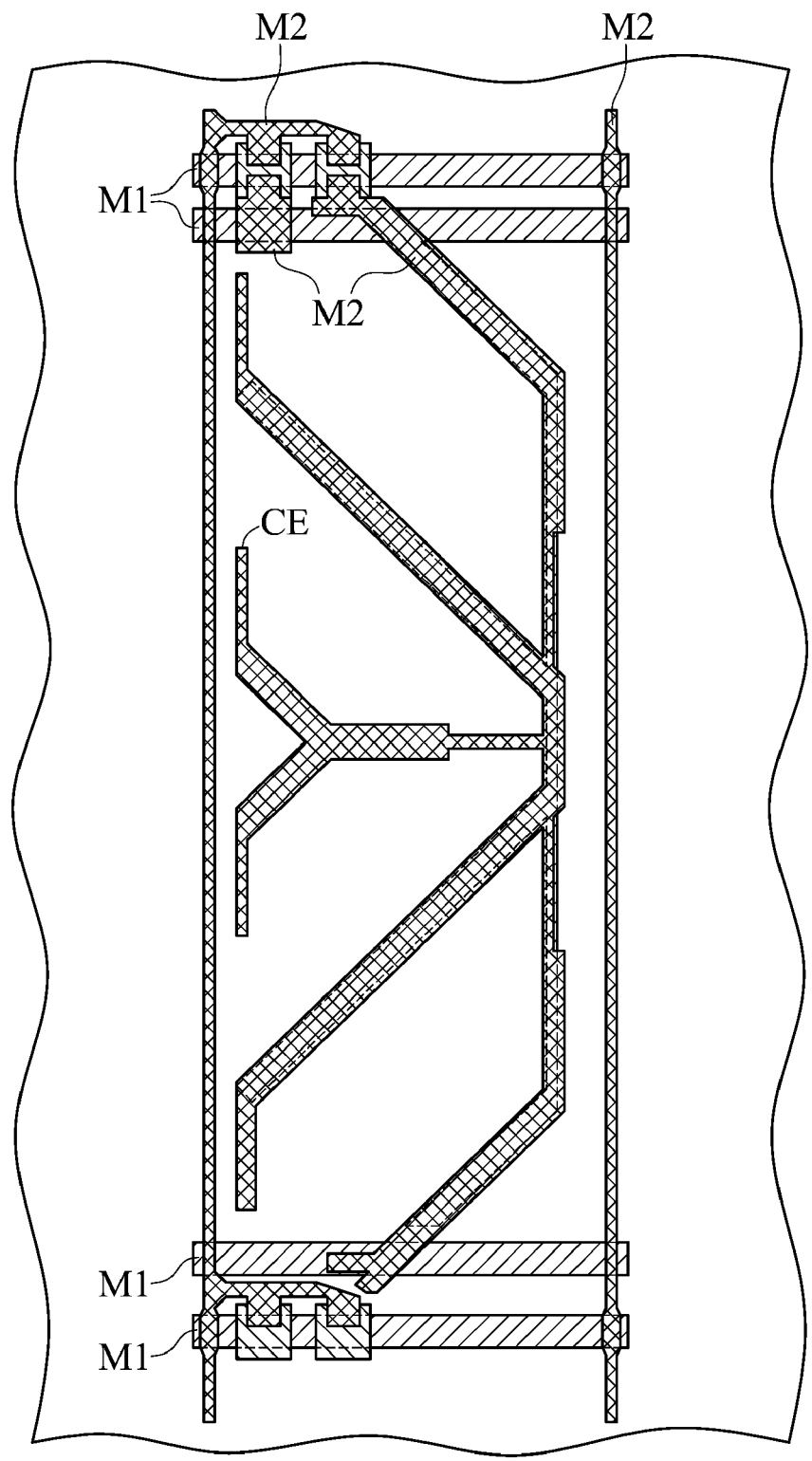
Figure 8D:
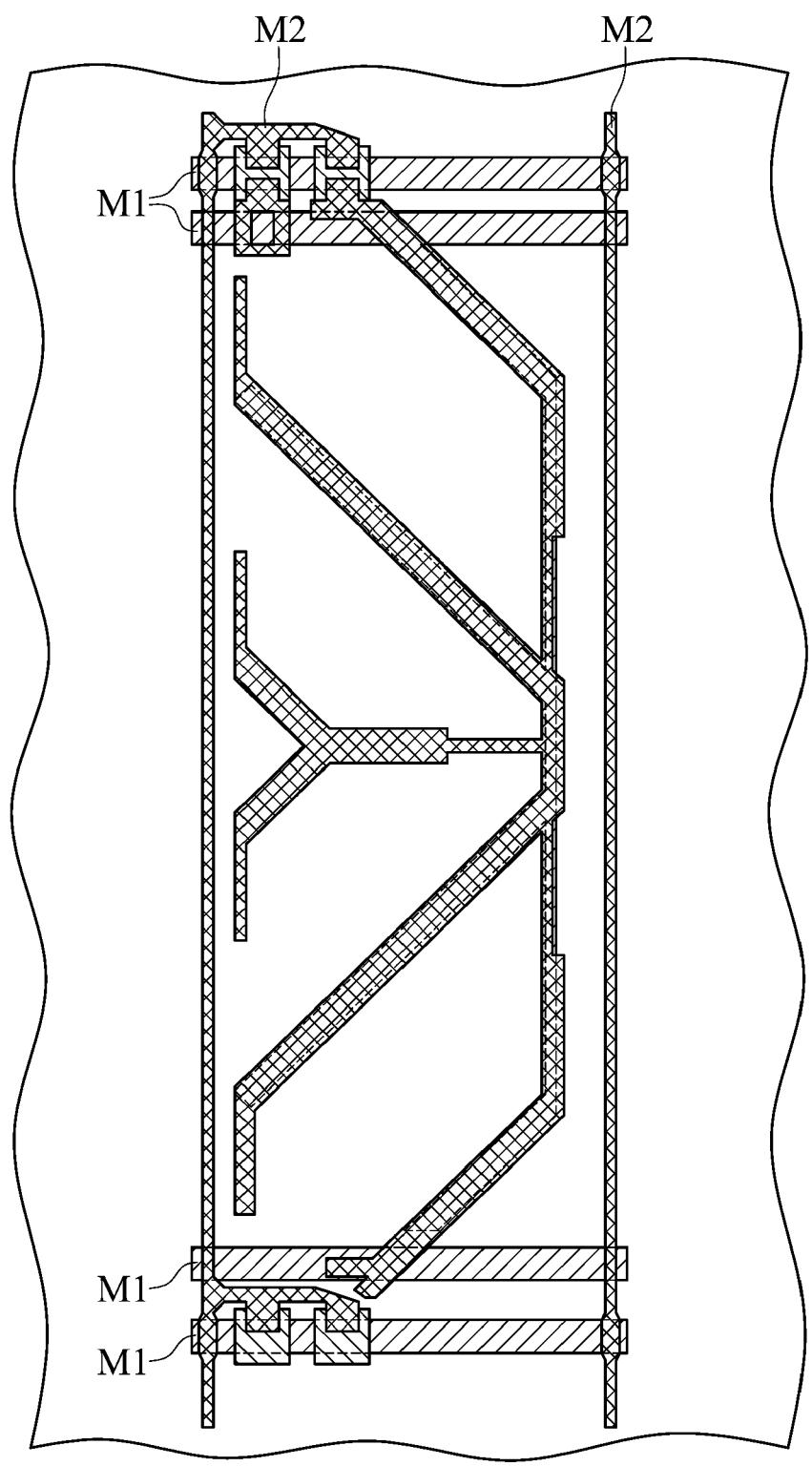
Figure 8E:
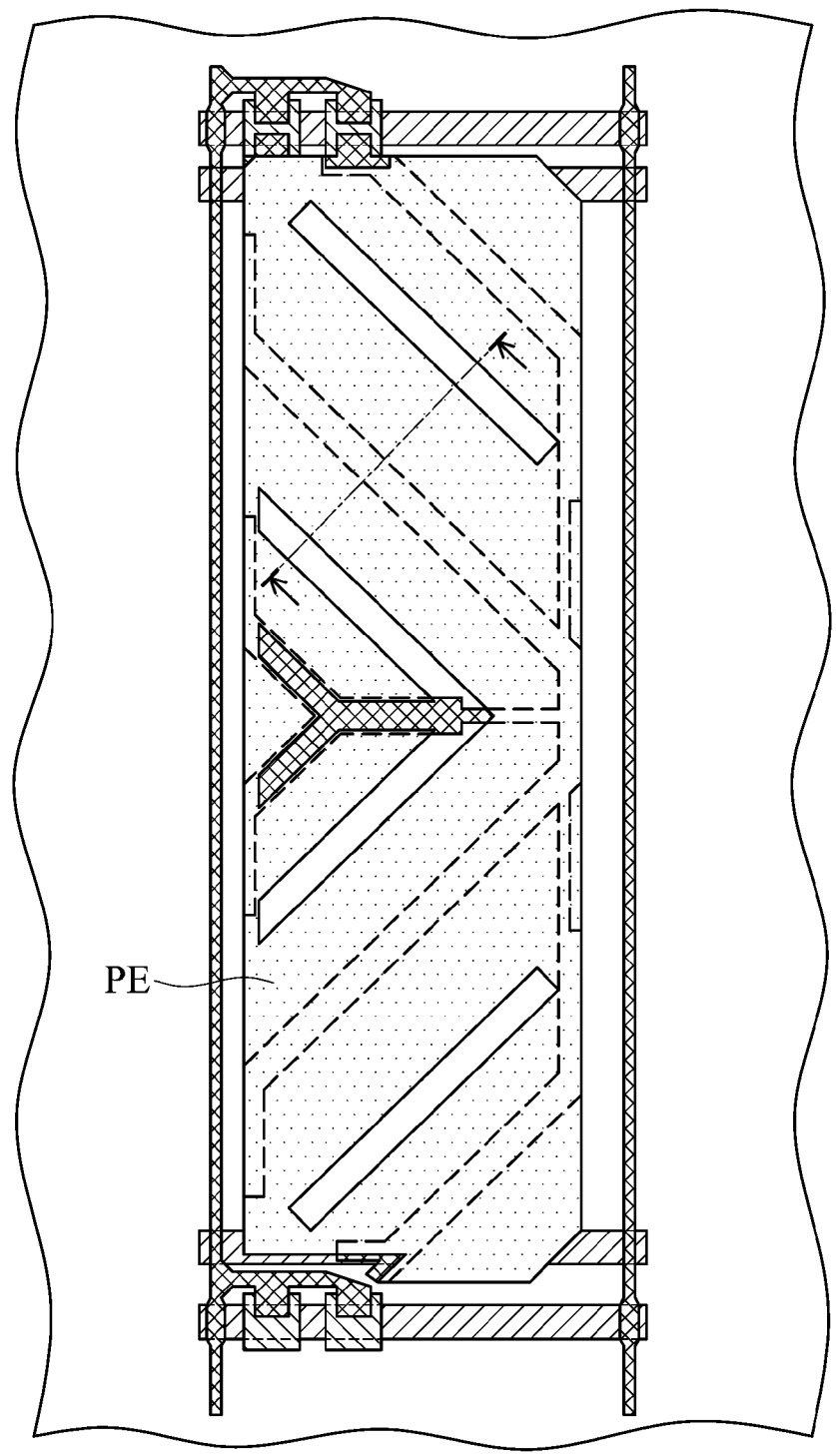

In order to fulfill the abovementioned circuit diagram, an exemplary embodiment is provided. FIGS. 8A-8E are layout diagrams compatible to the typical process for thin film transistors. FIG. 8A is a layout diagram of the first metal layer (also referred to metal 1) M1, in which a primary objective is to fabricate a gate, a gate line, at least two common electrode lines com1 and com2, and the coupling electrode C of the present invention. Preferably, the coupling electrode C is extended from any one of the common electrode lines, but is not limited thereto. The coupling electrode C can be extended from none of the common electrode lines or all of the common electrode lines. FIG. 8B is a layout diagram of the semiconductor layer S1, in which a primary objective is to fabricate a channel region of the thin film transistor. The semiconductor layer is made from materials including amorphous silicon, polysilicon, single crystalline silicon, microcrystalline silicon, and germanium-containing material with the abovementioned lattice structure, or other materials, or combinations thereof. Note that, in certain embodiments of the present invention, amorphous silicon (α-Si) is exemplified, but is not limited thereto. FIG. 8C is a layout diagram of the second metal layer (also referred to metal 2) M2, in which a primary objective is to fabricate a data line, a source/drain, and the control electrode CE of the present invention. At this stage, the gate, semiconductor layer, and source/drain are construction of a switching device (e.g., a thin film transistor). FIG. 8D is a layout diagram of the through holes exposing a portion of the source/drain. FIG. 8E is a layout diagram of the pixel electrode PE connected to any one of the two switching devices (T1 and T2). The material of the pixel electrode PE includes transparent materials (such as indium tin oxide (ITO), indium zinc oxide (IZO), aluminum zinc oxide (AZO), cadmium tin oxide (CTO), aluminum tin oxide (ATO), hafnium oxide, or other materials, or combinations thereof), or reflective materials (such as Au, Ag, Cu, F, Sn, Pb, Ni, Cd, Mo, Nd, W, Ti, Ta, or other materials, or nitrides thereof, or oxides thereof, or oxynitrides thereof, or alloys thereof, or combinations thereof), or combinations thereof. Note that transparent materials such as indium tin oxide (ITO) and indium zinc oxide (IZO) are exemplified in certain embodiments, but is not limited thereto. Preferably, the pixel electrode PE has a plurality of slits, the shaped of the slits and/or the arrangement typed of the slits is not limited thereto.

Figure 9A:
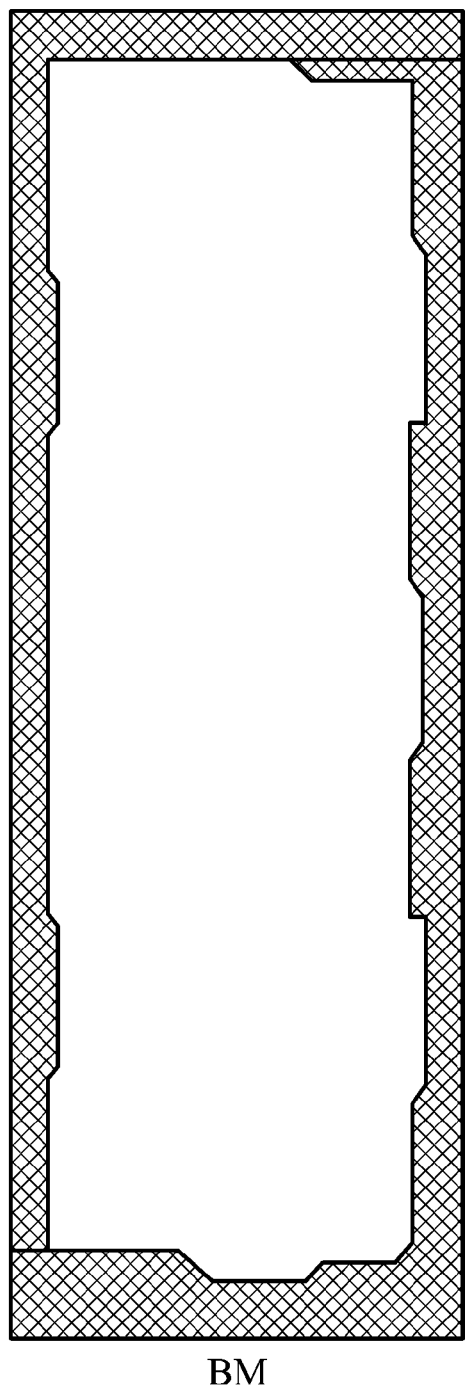
FIGS. 9A and 9B are layouts of photo-masks required by the upper substrate.
Figure 9B:
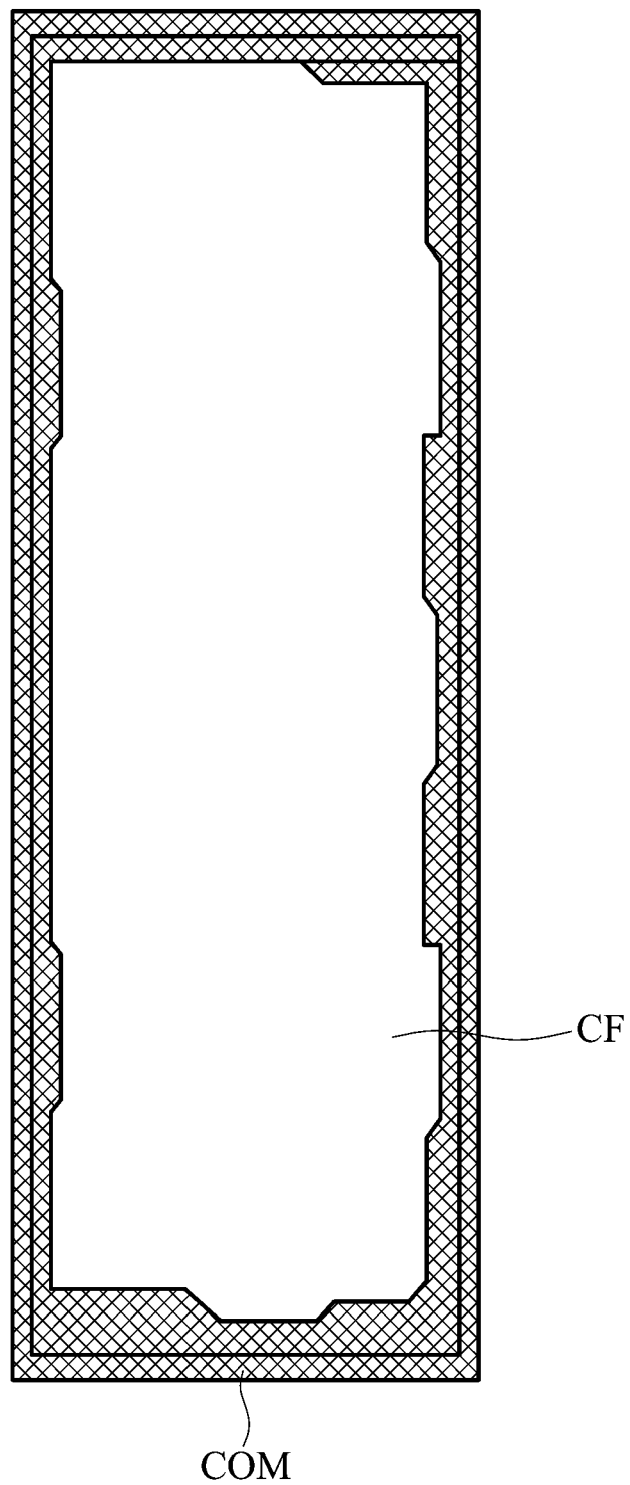

FIG. 9A and FIG. 9B are layout diagrams of the upper substrate according to an embodiment of the present invention. The upper substrate (also referred as a second substrate) is comprise a black matrix, a color filter (CF), and a common electrode COM as a example, but is not limited thereto, the upper substrate comprise a black matrix and a common electrode COM, or only one of a common electrode COM. The pixel assembled by the upper substrate and the lower substrate (also referred as a first substrate) includes two thin film transistors. The data line DL provides electricity to the control electrode CE of the second metal layer (metal 2) via the thin film transistor T2 on the right side. In addition, the data line DL provides electricity to the pixel electrode PE via the thin film transistor T1 on the left side, wherein at least one of the upper and lower substrate is made of materials including transparent materials (e.g., glass, quartz, or the likes), opaque materials (e.g., wafer, ceramic, or the likes), or flexible materials (e.g., plastic, rubber, polycarbonate, polymethylmethacrylic, polyester, polyolefines, or the likes). Note that, in certain embodiments of the invention, a transparent glass is exemplified, but is not limited thereto. At least one of the first transistor T1 and the second transistor T2 can be a top-gate type, a bottom-gate type (e.g., a back channel etch (BCE) type, an etching-stopper type, or the likes), or combinations thereof. The present invention is exemplified by using a bottom gate type transistor, but is not limited thereto. Furthermore, all of the semiconductor layers or parts of the semiconductor layers can be doped with n-type dopants, p-type dopants, or combinations thereof. The present invention is exemplified by doping n-type dopants in part of the semiconductor layer, but is not limited thereto.

Figure 10A:
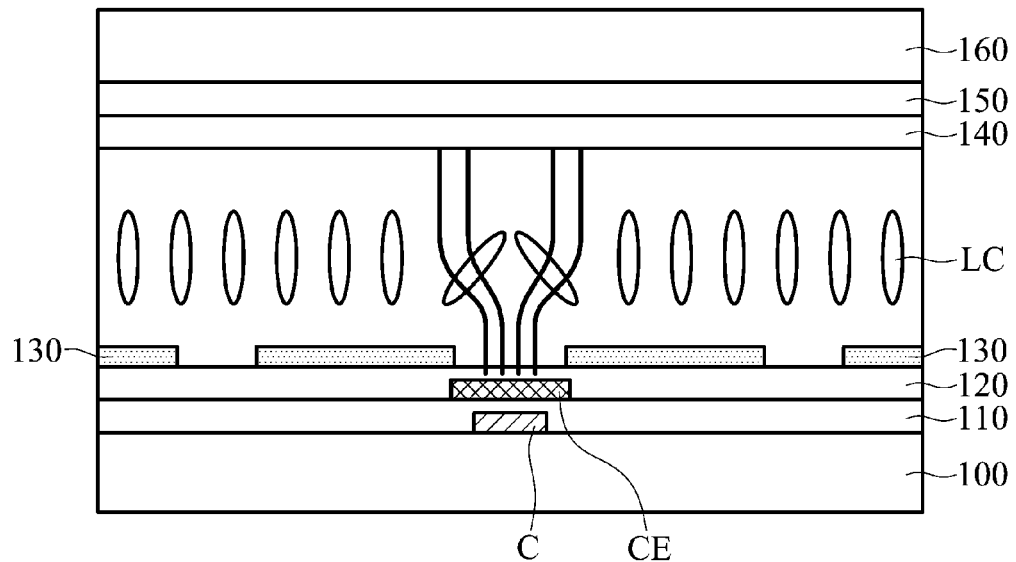
FIG. 10A and FIG. 10B are cross sections, respectively, illustrating LC molecules distribution at a bright state and a dark state in a pixel structure of the present invention.
Figure 10B:
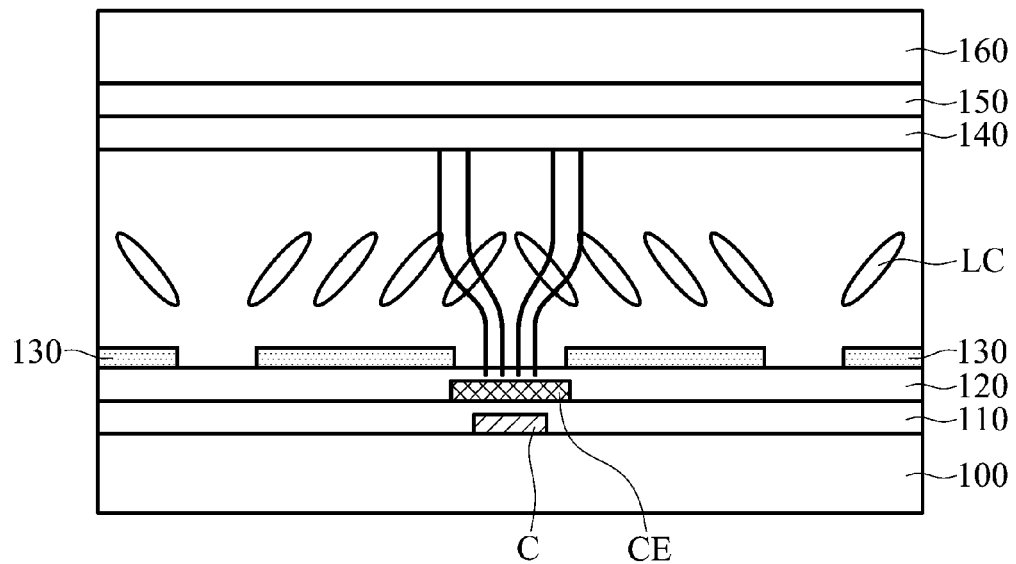
Figure 11:
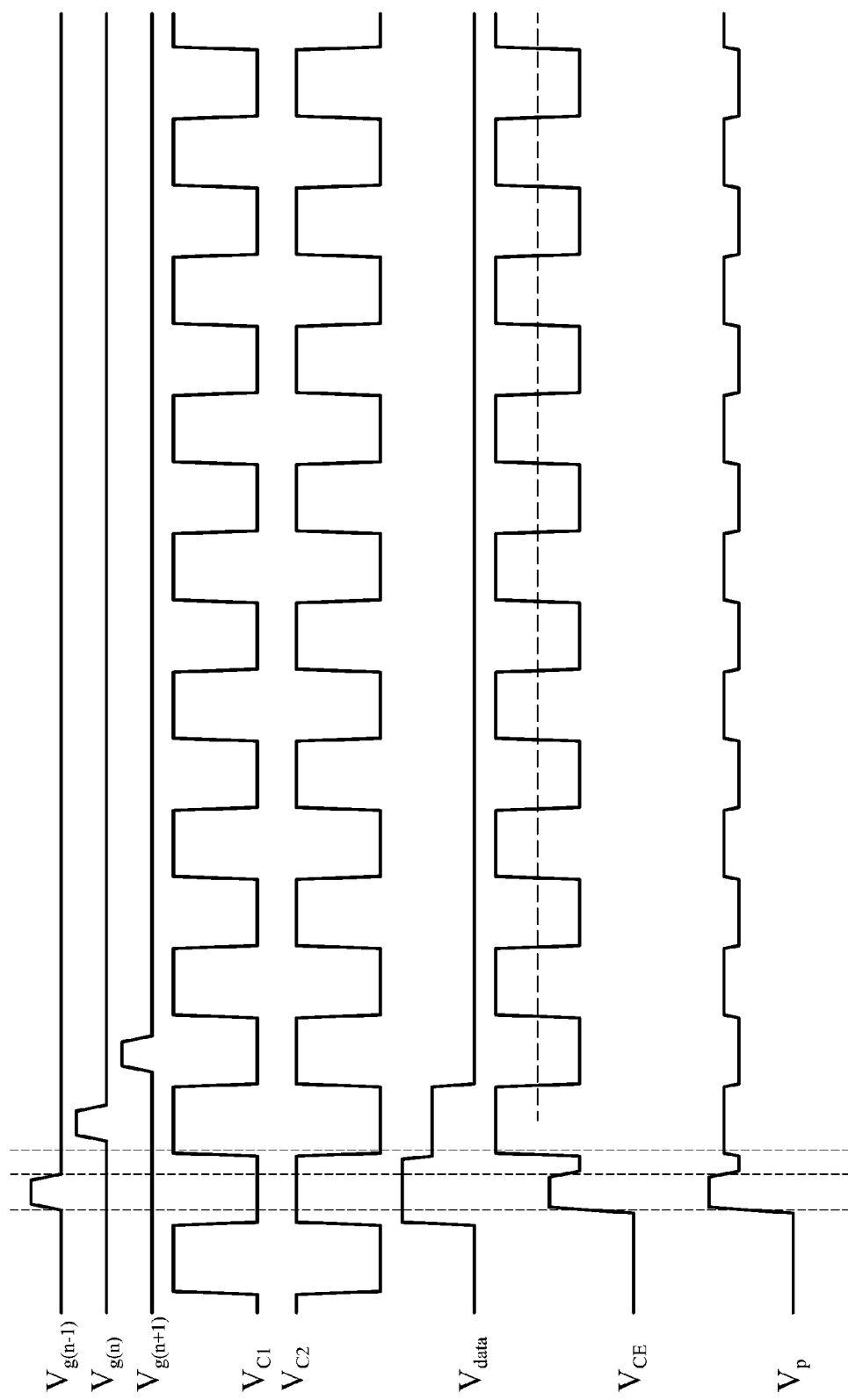
FIG. 11 shows driving signal waveforms for an embodiment of the pixel structure of the present invention.
Figure 12A:
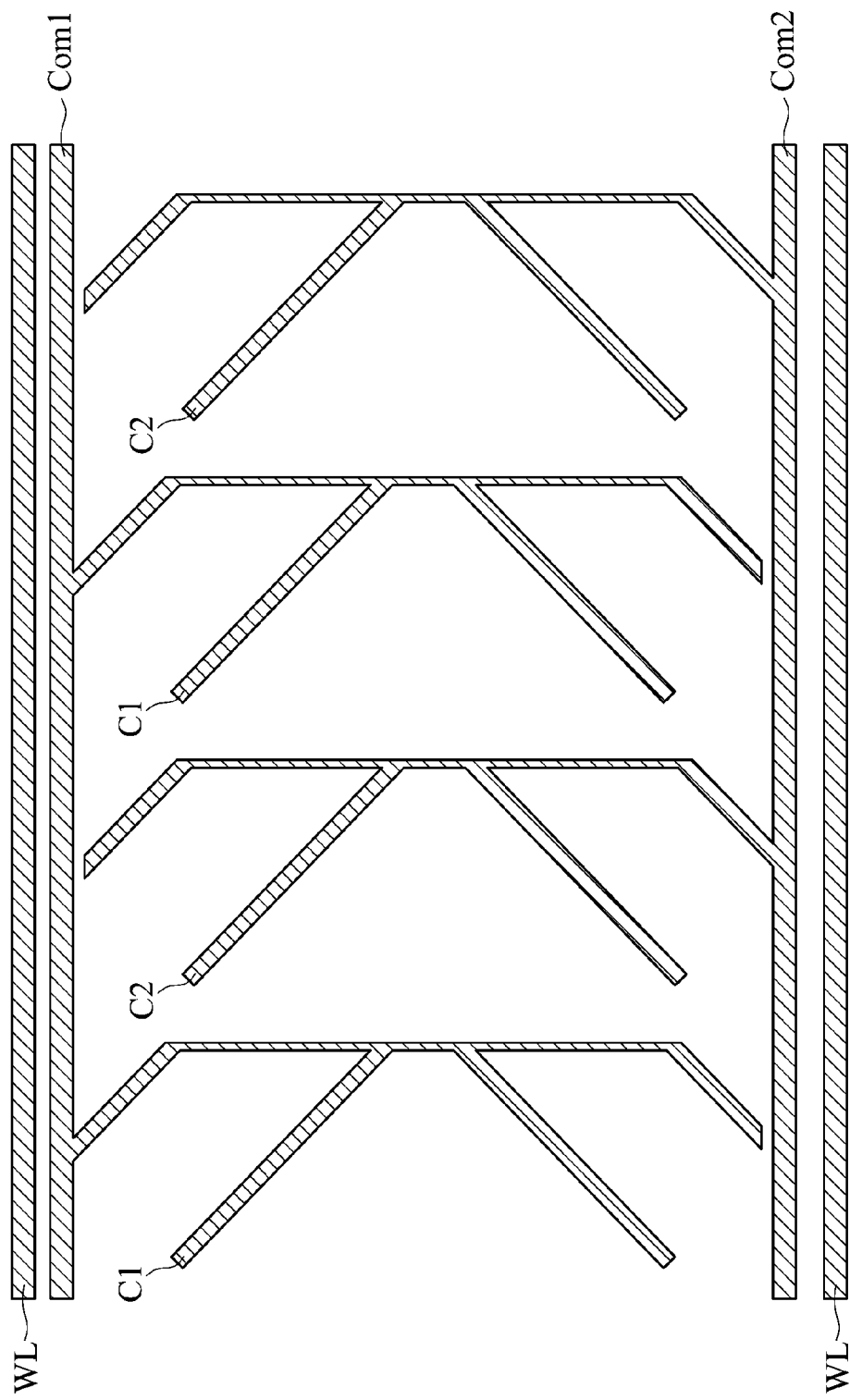
FIGS. 12A to 12E are schematic views of photo-masks for designing two coupling electrodes in a pixel according embodiments of the present invention.
Figure 12B:
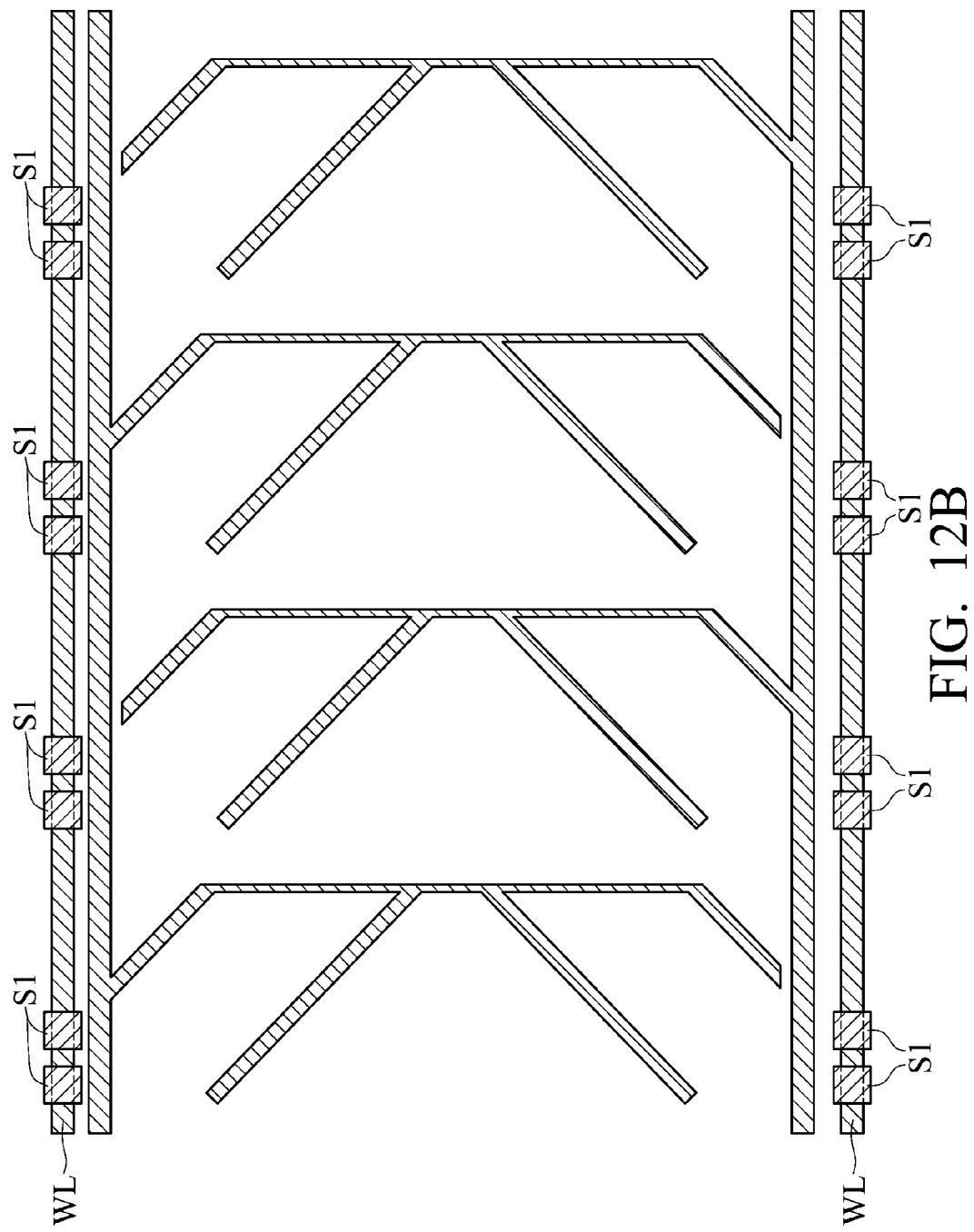
Figure 12C:
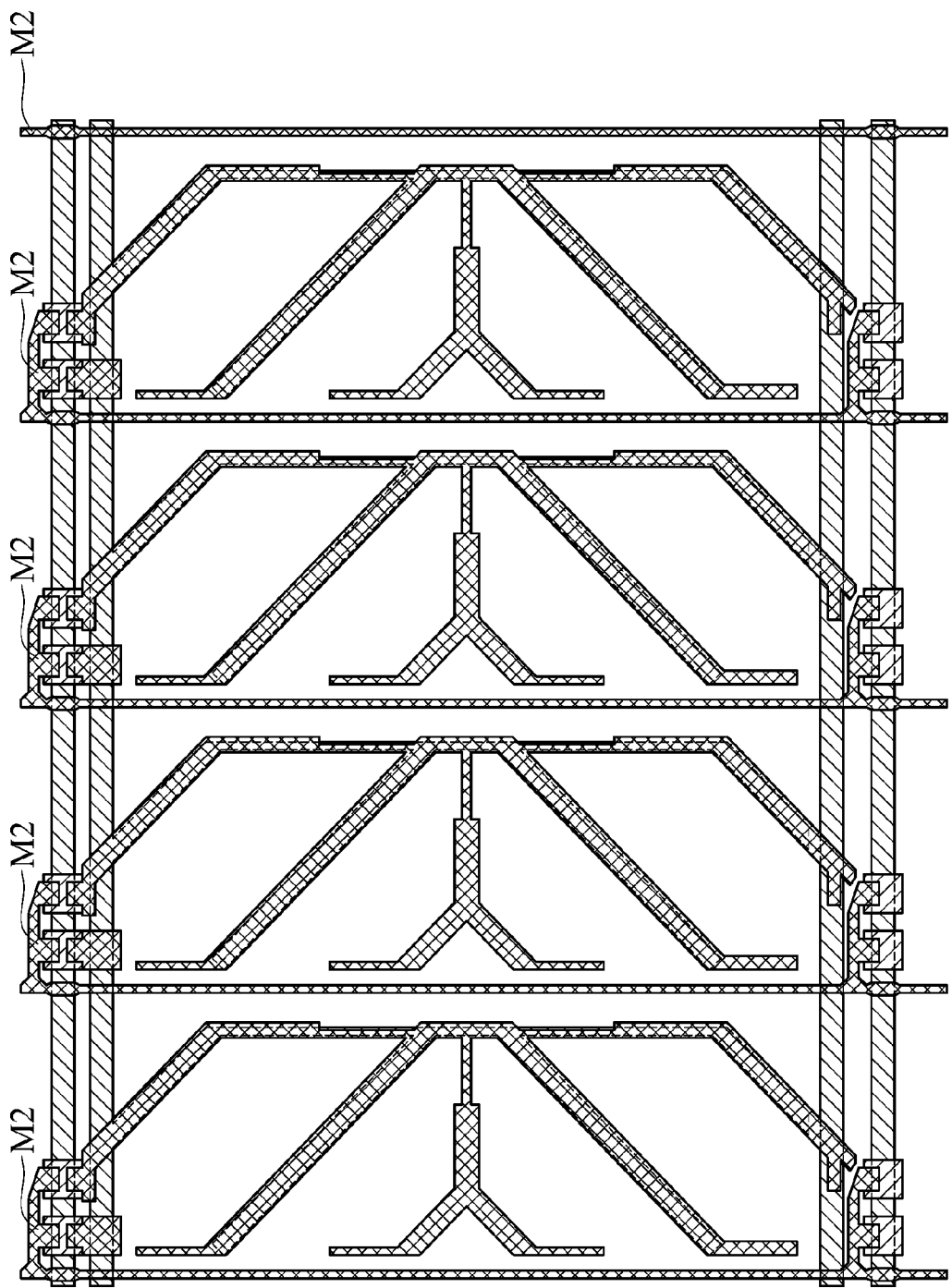
Figure 12D:
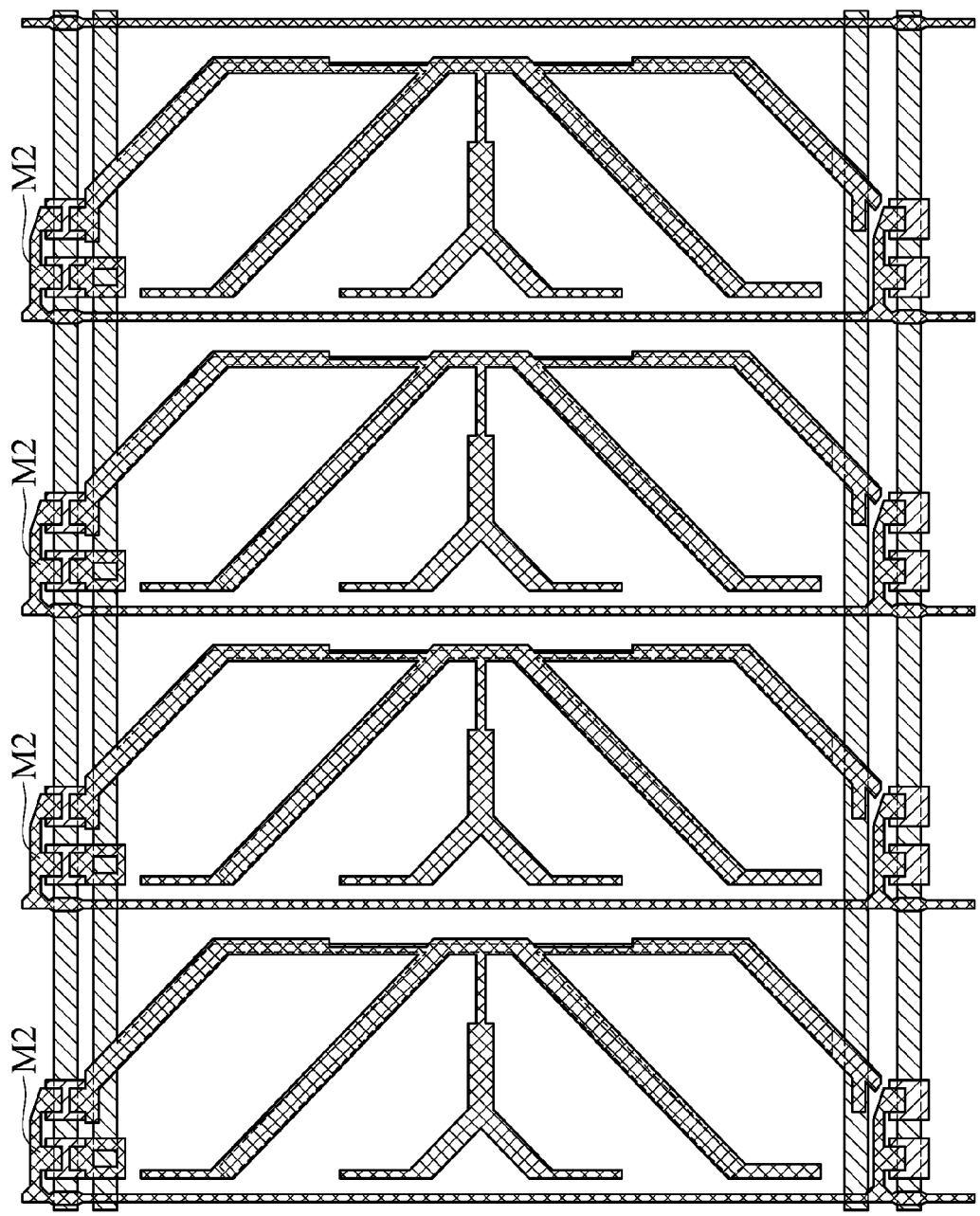
Figure 12E:
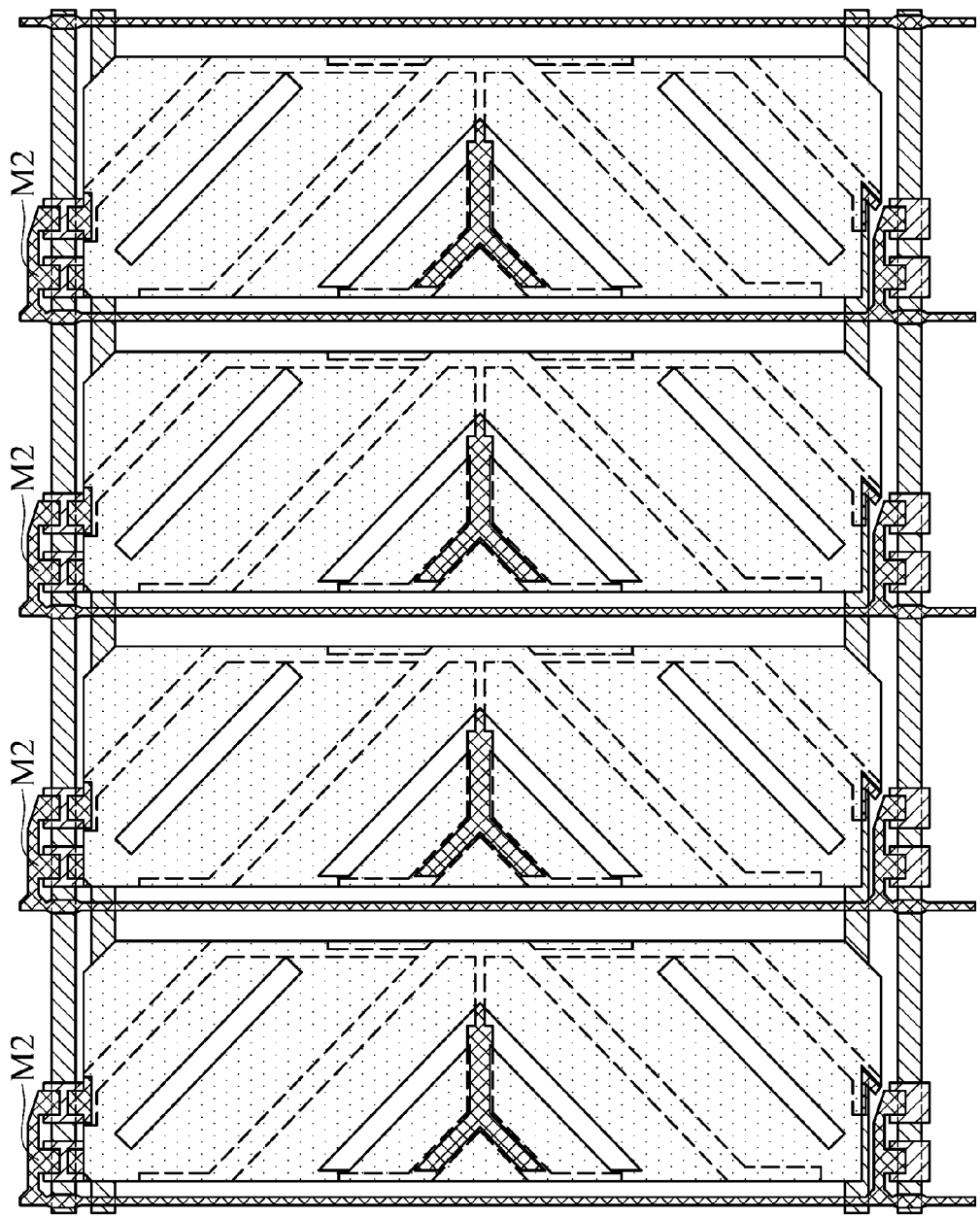

FIG. 10A and FIG. 10B are cross sections, respectively, illustrating LC molecule distribution at a bright state and a dark state in a pixel structure of the present invention, wherein embodiments of FIG. 10A and FIG. 10B are exemplified by a coupling electrode C disposed on the lower substrate. A dielectric layer 110 covers the coupling electrode C. A control electrode CE is formed on the dielectric layer 110 and locates on the coupling electrode C. A passivation layer 120 covers the control electrode CE. A transparent conductive layer 130 is then patterned and formed on the passivation layer 120. Liquid crystal molecules LC, a transparent conductive layer 140 on the upper substrate, color filters 150, and the upper substrate 160 are sequentially disposed on the patterned transparent conductive layer 130. In other embodiment, the color filters 150 can be not formed on upper substrate 160. Note that the coupling electrode C is exemplified by extending from one of the common electrode lines, but is not limited thereto. The coupling electrode C can be extended from none of all of the common electrode lines or all of the common electrode lines. The driving Tsignal waveform of the pixel structure is illustrated in FIG. 11, when an embodiment of the present invention provides a pixel structure with two common electrode lines, and the coupling electrode C is exemplified by extending from one of the two common electrode lines. The scan lines of the display panel are sequentially scanned from top to bottom. Vdata represents voltage loaded on the data lines corresponding to the pixel electrode. Voltages on the coupling electrodes C1 and C2 are periodically oscillated. When the last scan line Vg(n−1) turns on the transistors, the control electrode and the pixel electrode are simultaneously charged via the data line according to the Vdata signal. When the last scan line Vg(n−1) is turned off, the pixel electrode is at a floating state. When the signals on the coupling electrodes C1 and C2 are transformed, the signals on the control electrode CE and the pixel electrode PE are changed via the coupling capacitors $C_{PE}$ and $C_{EP}$. In FIG. 11, voltages on the control electrode CE and the pixel electrode are pulled up by the coupling electrode C1. Driven by a positive polarity (i.e., voltage on the pixel electrode is substantially greater than the common electrode), the amplitude of the voltage $V_{CE}$ on the control electrode can be substantially greater than the voltage Vp on the pixel electrode by appropriately designing the coupling capacitors $C_{CE}$ (such as with higher capacitance value) and $C_{PE}$ (such as with lower capacitance value). Therefore, the root mean square value of voltage differences between the control electrode and the common electrode of the upper substrate is substantially different from the root mean square value of voltage differences between the pixel electrode and the common electrode of the upper substrate. Preferably, the root mean square value of voltage differences between the control electrode and the common electrode of the upper substrate is substantially greater than the root mean square value of voltage differences between the pixel electrode and the common electrode of the upper substrate.

Although the voltage requirement of the control electrode can be achieved by the abovementioned descriptions, however, a line inversion method, a column inversion method, a dot inversion method, and a two line dot inversion method are currently used in driving display panels, which can reducing panel flicker or cross-talk. For dot inversion and two line dot inversion conductions, the pixel electrodes on the same gate line can be positive and negative polarities at the same time. Thus, at the positive polarity, the voltage $V_{CE}$ of the control electrode CE must be substantially greater than the voltage Vp of the pixel electrode PE. At the negative polarity, the voltage $V_{CE}$ of the control electrode CE must be substantially lower than the voltage Vp of the pixel electrode PE. For example, the transmission voltage on the common electrode of the upper substrate is about 6V. When pixel driving is at a positive half cycle (about 6V to about 11.5V), say about 11.5V, the voltage $V_{CE}$ of the control electrode CE must be substantially greater than about 11.5V, for example, about 14V. When pixel driving is at a negative half cycle (about 0.5V to about 6V), say about 0.5V, the voltage $V_{CE}$ of the control electrode CE must be substantially less than about 0.5V, for example about −4V. Therefore, signals on the coupling electrodes C1 and C2 are required to be substantially different, preferable substantially inverted, between the positive and negative polarities of signals, wherein the design is illustrated in FIG. 12. At dot inversion, electrical characteristics of the two coupling electrode C1 and C2 are substantially inverted. Specifically, for each received pixel, such positive polarity pixels can pull up the voltage $V_{CE}$ of the control electrode CE via the positive polarity of the coupling electrode C1, and negative polarity pixels can pull down the voltage $V_{CE}$ of the control electrode CE via the negative polarity of the coupling electrode C2. The waveforms of the coupling electrodes C1 and C2 are shown in FIG. 11.

Although the abovementioned embodiments are illustrated by a five step photolithography process, other methods (such as a four or less steps photolithography process, an additional organic material with high aperture process, a color filter on array (COA) process, and an array on color filter (AOC) process) are also applicable thereto. Note that the COA process and the AOC process are illustrated such that the color filter is formed on the lower substrate 100 instead of the upper substrate 160. While the invention is exemplified, by using the color filter on the upper substrate 160, it is not limited thereto.

Figure 13A:
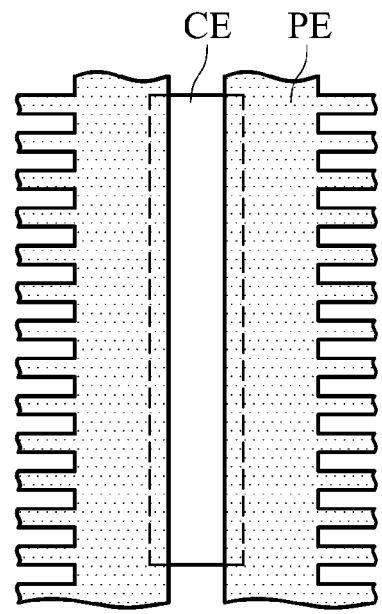
FIGS. 13A to 13H show the relationships between the control electrodes and the pixel electrodes.
Figure 13B:
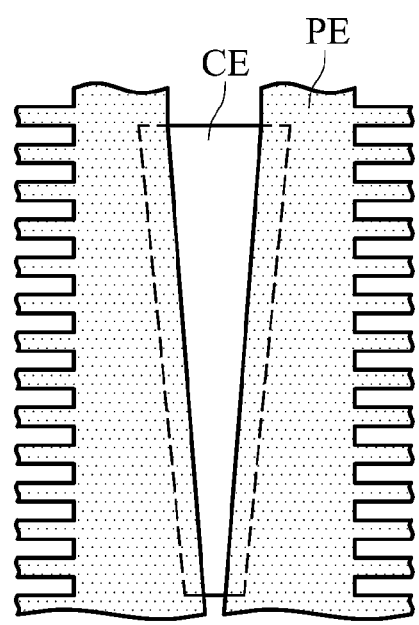
Figure 13C:
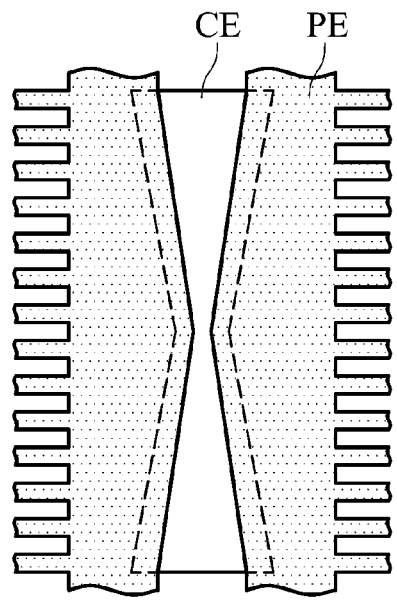
Figure 13D:
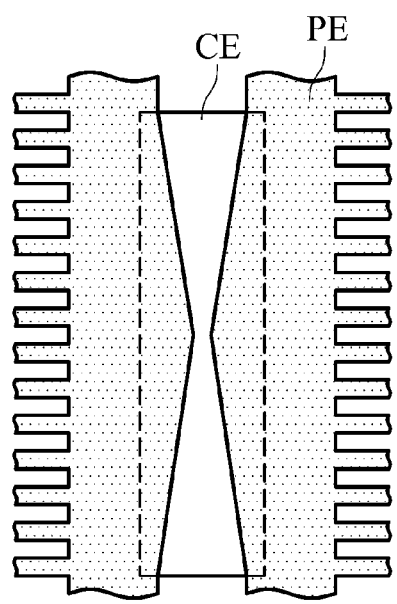
Figure 13E:
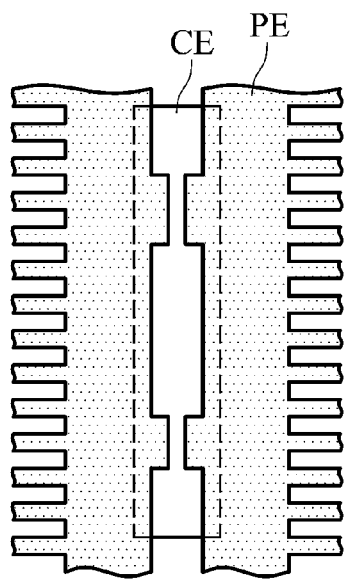
Figure 13F:
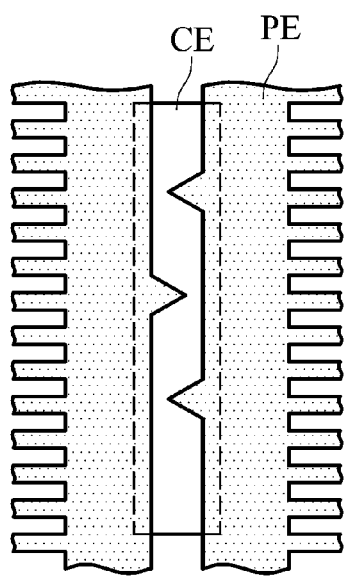
Figure 13G:
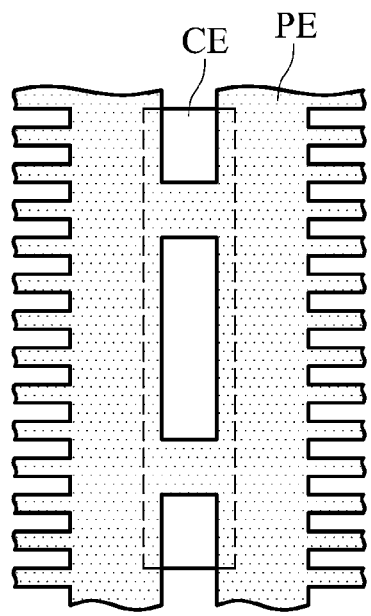
Figure 13H:
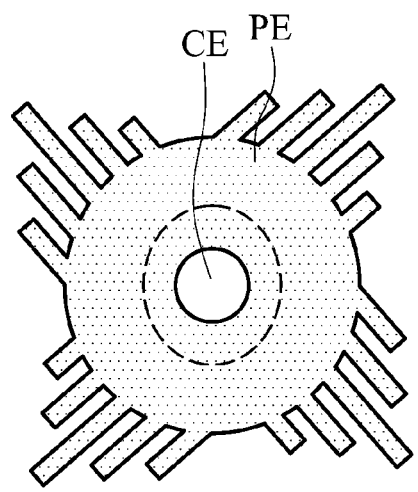

Although the abovementioned embodiments are exemplified by selecting the control electrode as parallel lines, layout patterns of the control electrode CE and the pixel electrode PE can be varied, as shown in FIG. 13A and FIG. 13B. The dash lines are depicted as the control electrode CE, while the dotted lines are depicted as the pixel electrode PE. FIGS. 13A to 13H, respectively, show that the control electrode CE and the pixel electrode PE are rectangular. The control electrode CE is trapezoidal when the pixel electrode PE is triangular, the control electrode CE and the pixel electrode PE are polygonal, the pixel electrode PE is polygonal when the control electrode CE is rectangular, and an inner side of the pixel electrode PE is protruded when the control electrode CE is rectangular. Additionally, the pixel electrode PE is irregular, the pixel electrodes PE are circular and connected when the control electrode CE is circular, and the inner sides of the pixel electrode PE are connected when the control electrode CE is rectangular. Note that other geometric patterns, or combinations thereof are possible and the embodiments of the invention are not limited thereto. Therefore, the shape of the control electrode CE can be coordinated/non-coordinated with the shape of the pixel electrode PE. Additionally, the coupling electrode can be designed to be substantially similar with or substantially different from the patterns of the control electrode. The coupling electrode can also be disposed beneath the control electrode to improve aperture ratio. Preferably, the coupling electrode can be designed, to be substantially similar with the patterns of the control electrode, but is not limited thereto.

Figure 14:
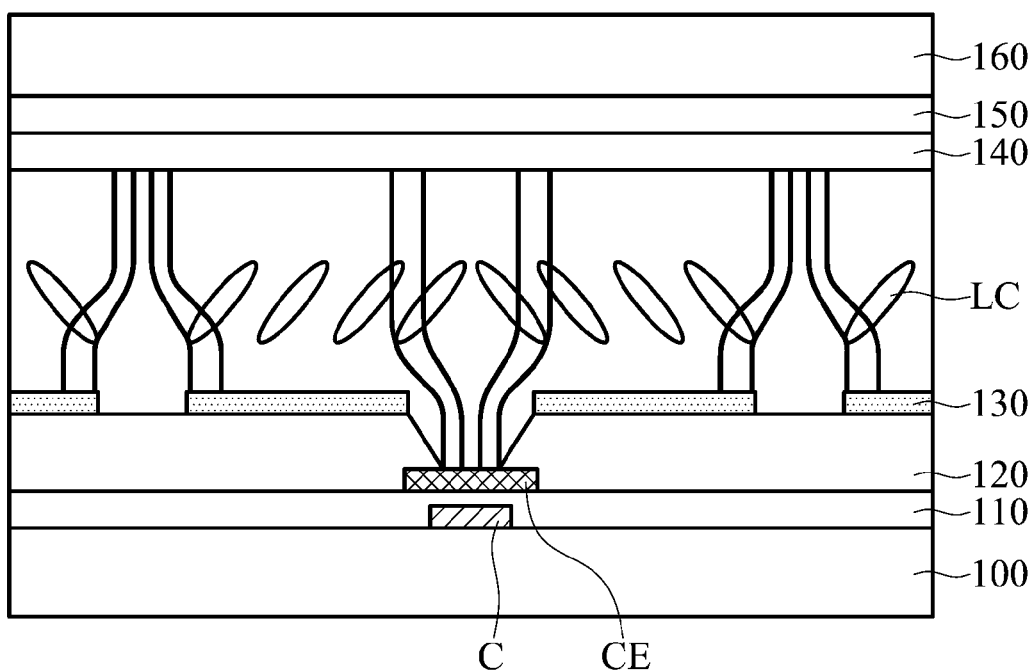
FIG. 14 is a cross section of another embodiment of a pixel structure of the present invention.

FIG. 14 is a cross section of another embodiment of the pixel structure of the present invention. This embodiment is basically similar to embodiments of FIGS. 10A and 10B, but in this embodiment, the passivation layer 120 is covering on the control electrode CE is partially removed. The voltage $V_{CE}$ on the control electrode must be substantially greater than the voltage Vp of the pixel electrode PE to generate an electric field tilting LC molecules towards the right indication. In FIG. 14, the passivation layer 120 primarily protects the thin film transistor by preventing liquid crystal molecules from damaging characteristics thereof. The passivation layer 120, however, can offset a portion of the voltage fraction from the control electrode CE to the liquid crystal molecules LC. Particularly, during the high aperture ratio process, the passivation layer 120 is a thick organic material preventing data lines from affecting signals on the pixel electrode. Under this process condition, the passivation layer 120 is covering on the control electrode must be removed, thereby reducing voltage of increment required by the control electrode CE relative to the pixel electrode, wherein a cross section is shown in FIG. 14. The main fabrication method includes removing the passivation layer 120 is covering on the control electrode CE during formation of the through holes, wherein the passivation layer is made of inorganic materials (e.g., silicon nitride, silicon oxide, silicon oxynitride, silicon carbide, black diamond-like materials, or other materials, or combinations thereof), organic materials (e.g., photo resist, polypropylene, polyester, polyepoxy, polyimide, polycarbonate, polyether, or other material, or combinations thereof), or combinations thereof.

Figure 15A:
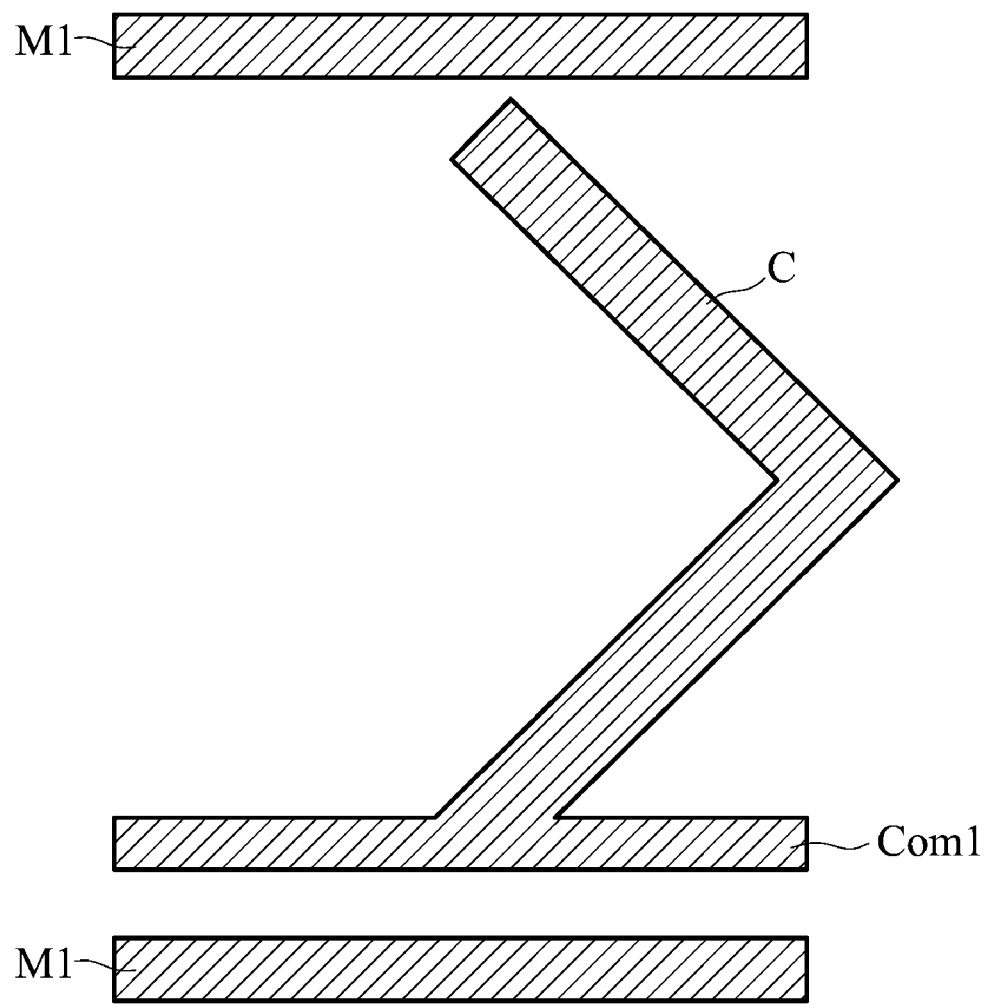
FIGS. 15A to 15C are layouts of photo-masks required by another embodiment of the pixel structure of the present invention.
Figure 15B:
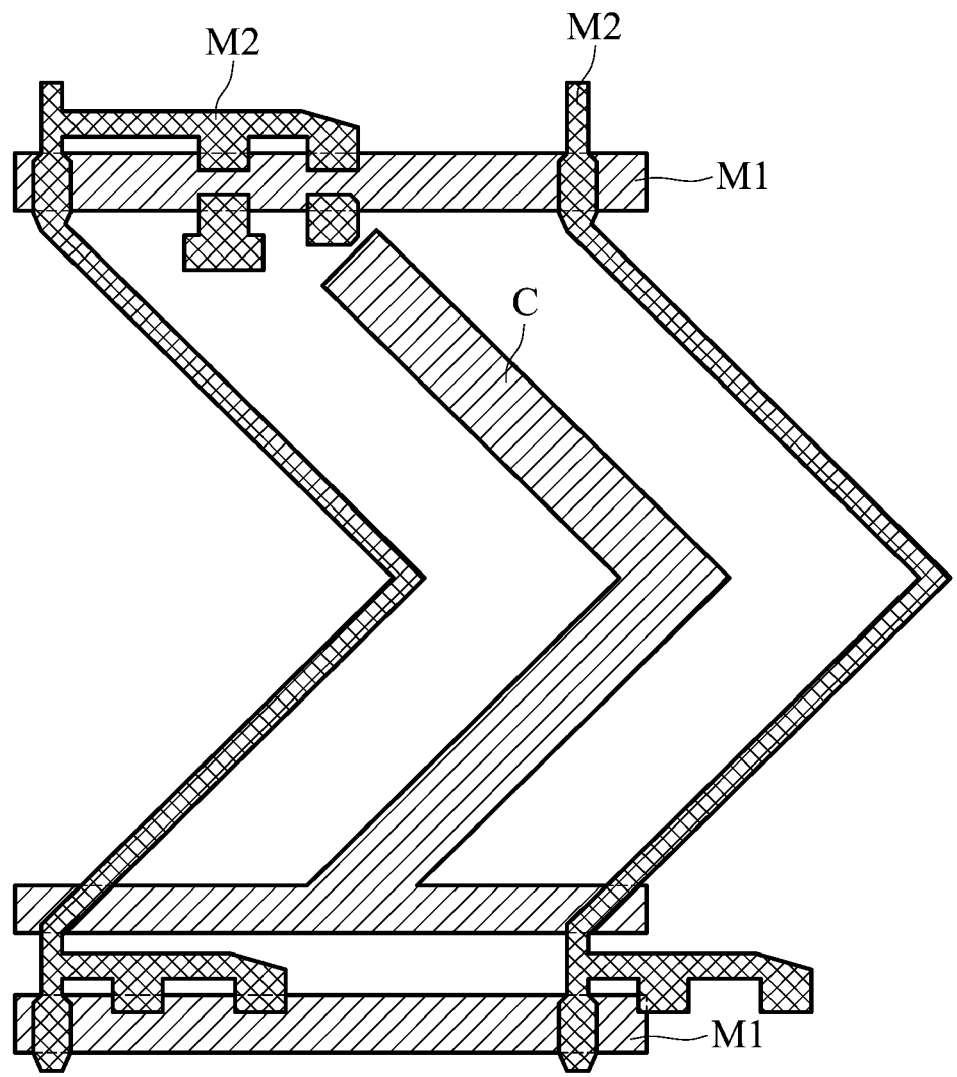
Figure 15C:
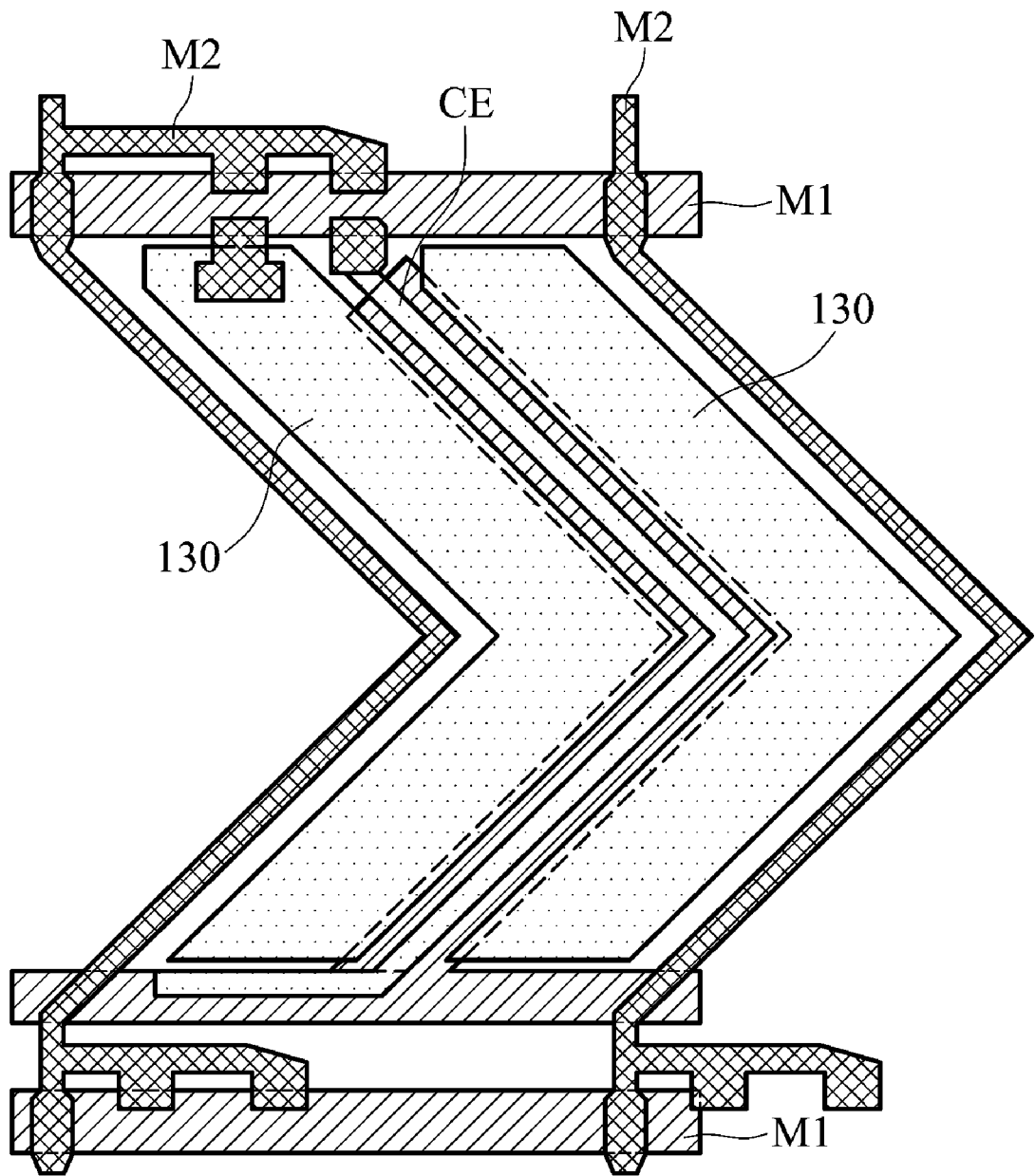
Figure 16:
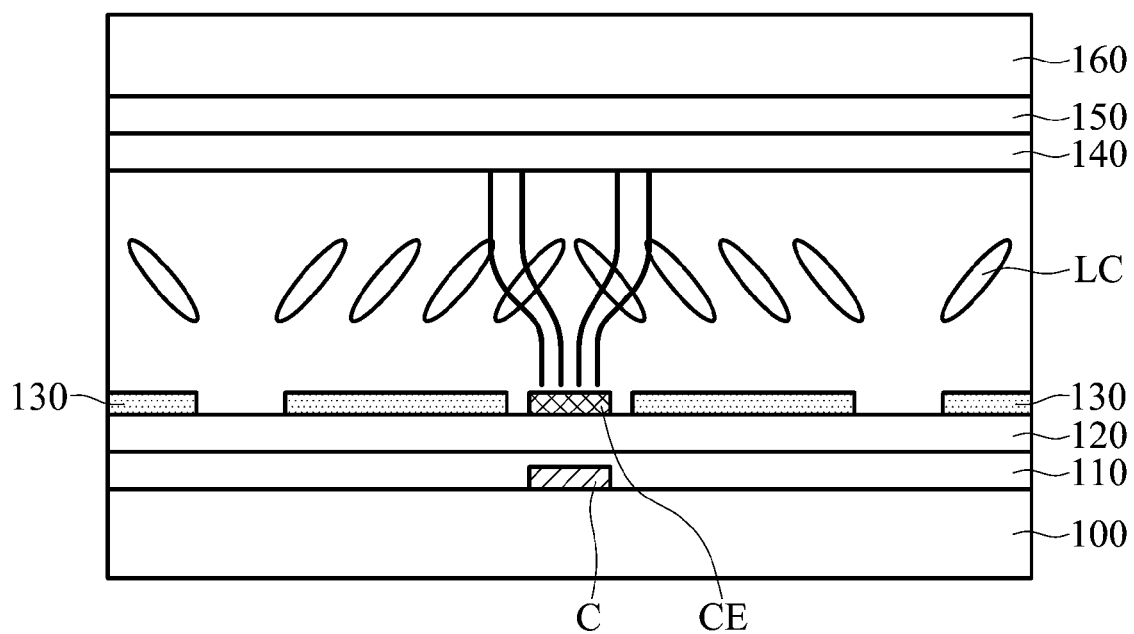
FIG. 16 is a cross section of still another embodiment of a pixel structure of the present invention.
Figure 17A:
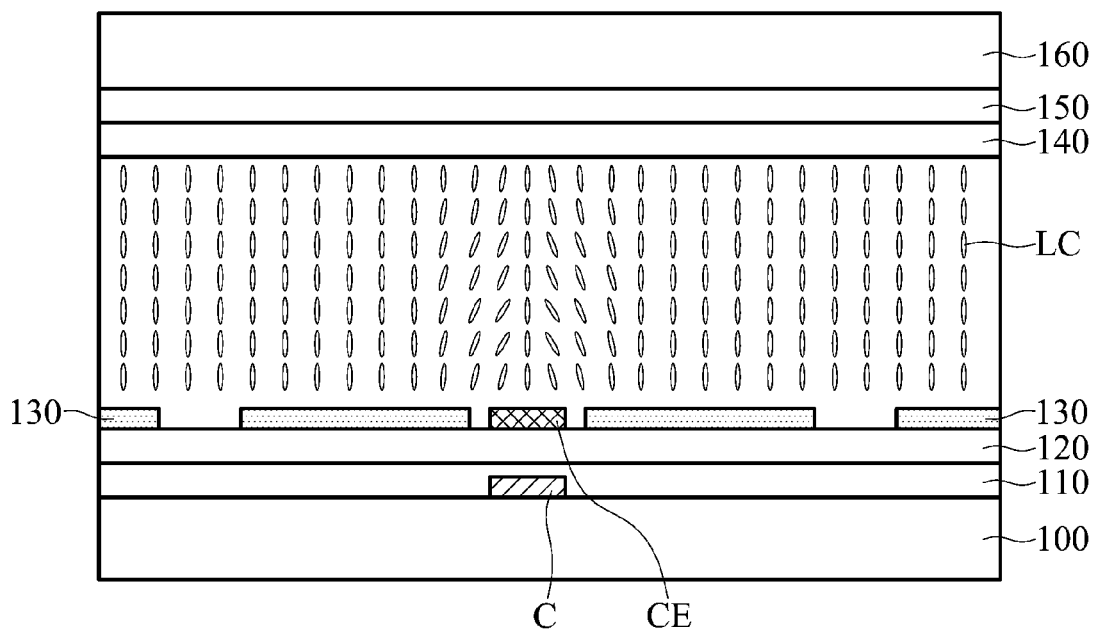
FIG. 17A and FIG. 17B are cross sections, respectively, illustrating LC molecules distribution at a bright state and a dark state in the pixel structure of FIG. 16.
Figure 17B:
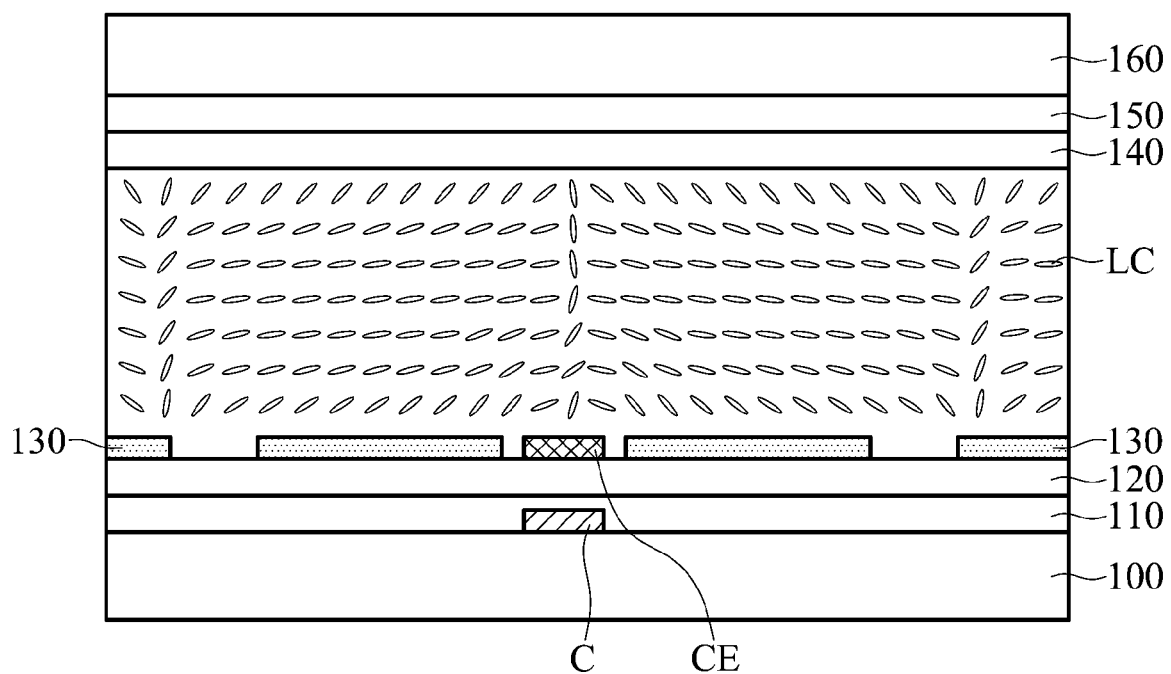

In the pixel structure of FIG. 8A to FIG. 8E, the control electrode can be realized by the second metal layer (metal 2), and the first metal layer (metal 1) serves as the coupling electrode C. Other methods, moreover, can also achieve the same effects. FIGS. 15A to 15C show the first metal layer (metal 1) M1 serving as the coupling electrode C and the transparent conductive layer 130 serving as control electrode CE. In this embodiment, a Z-shaped pixel is exemplified, for the purpose of illustration, but is not limited thereto, wherein the cross section is shown in FIG. 16. FIG. 17A and FIG. 17B are cross sections, respectively, illustrating an embodiment of LC molecule distribution at a bright state and a dark state in a pixel structure of the present invention, wherein a coupling electrode C is disposed on the lower substrate 100. A dielectric layer 110 and a passivation layer 120 cover on the coupling electrode C. A control electrode CE and patterned transparent conductive layer 130 are formed on the passivation layer 120 and the control electrode CE is located on the coupling electrode C. Liquid crystal molecules LC, a transparent conductive layer 140 on the upper substrate, color filters 150, and the upper substrate 160 are sequentially disposed on the patterned transparent conductive layer 130 (i.e., the pixel electrode PE). In other embodiment, the color filters 150 can be not formed on upper substrate 160. This pixel structure is driven by the driving signal waveforms of FIG. 11. The root mean square value of voltage differences between the control electrode CE and the common electrode of the upper substrate 160 is substantially greater than the root mean square value of voltage differences between the pixel electrode and the common electrode of the upper substrate.

Figure 18A:
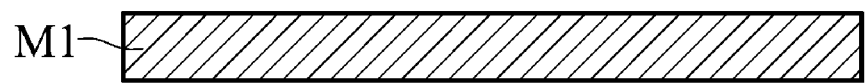
FIGS. 18A to 18C are layouts of photo-masks required by still another embodiment of the pixel structure of the present invention.
Figure 18A:
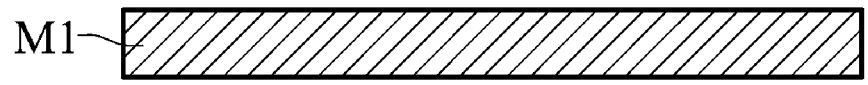
Figure 18B:
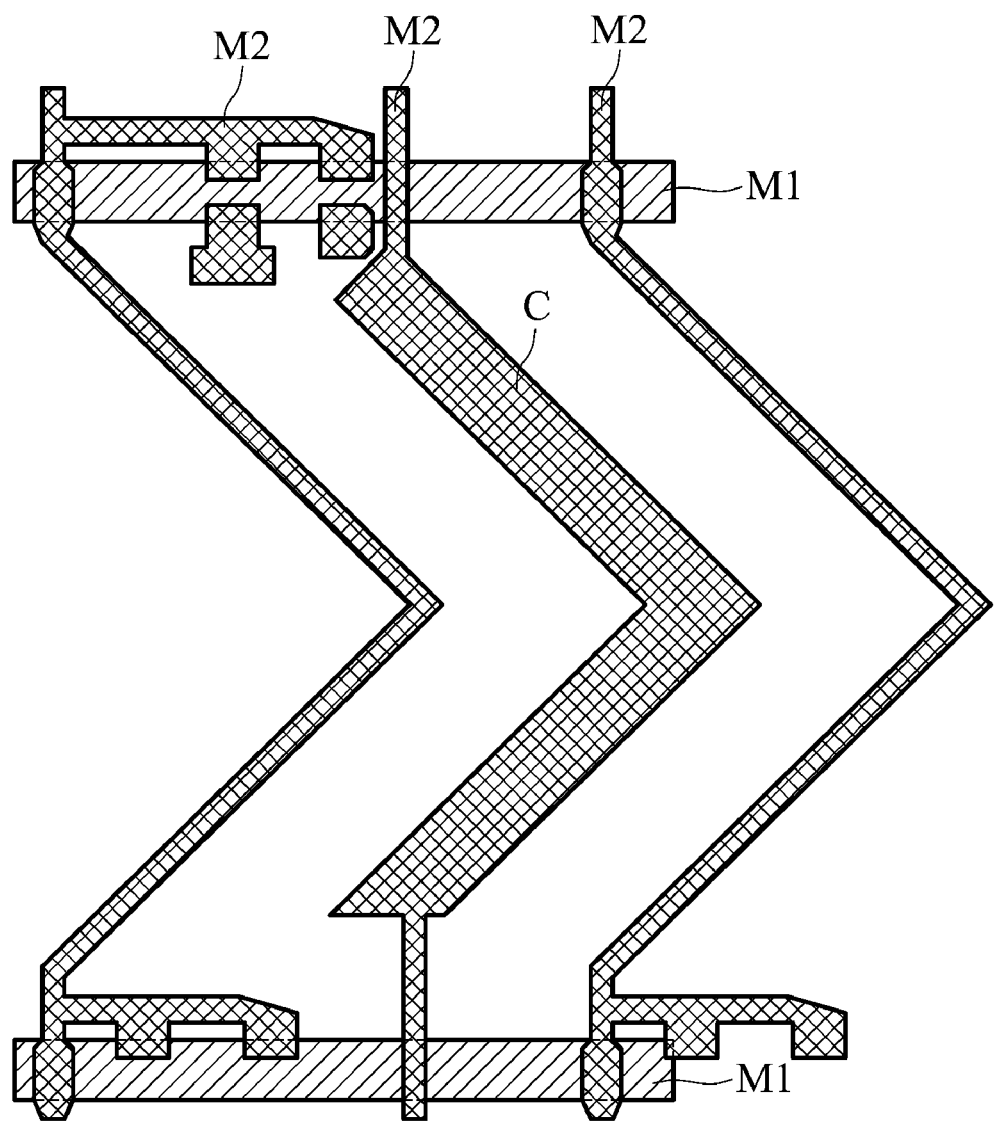
Figure 18C:
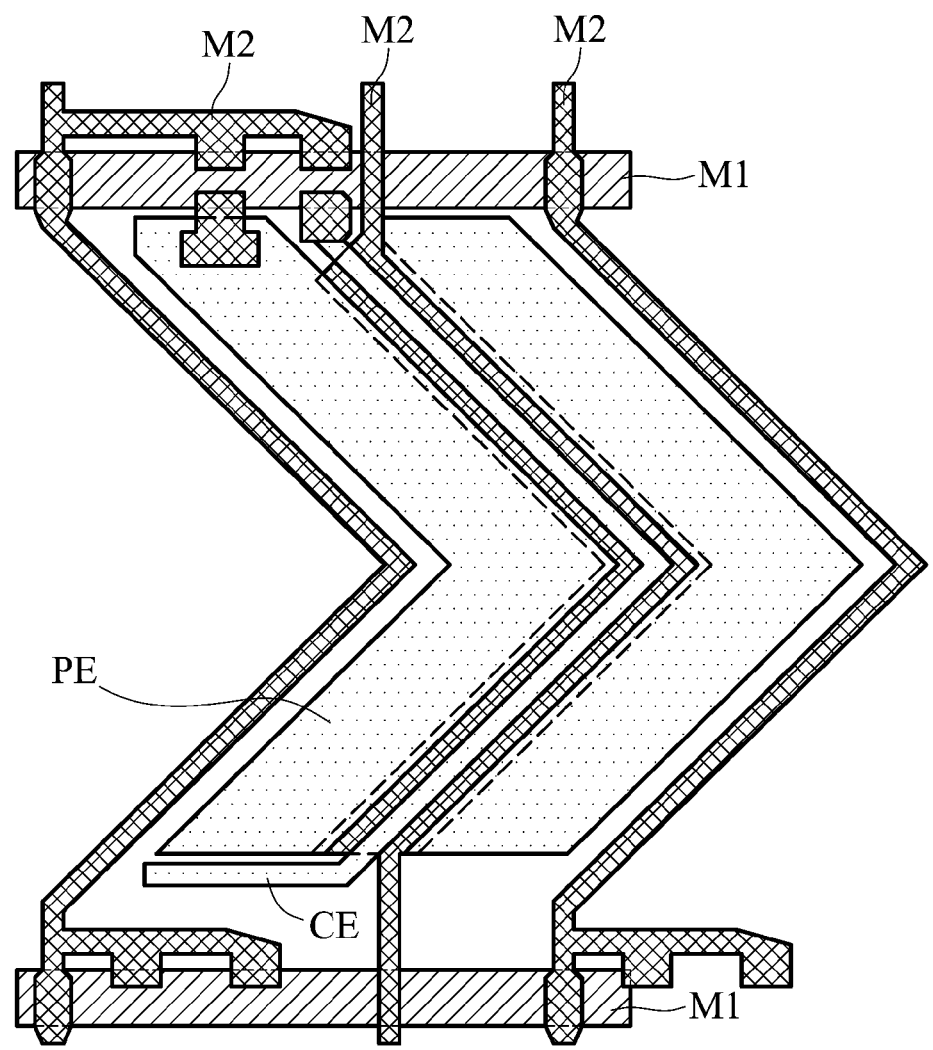
Figure 19:
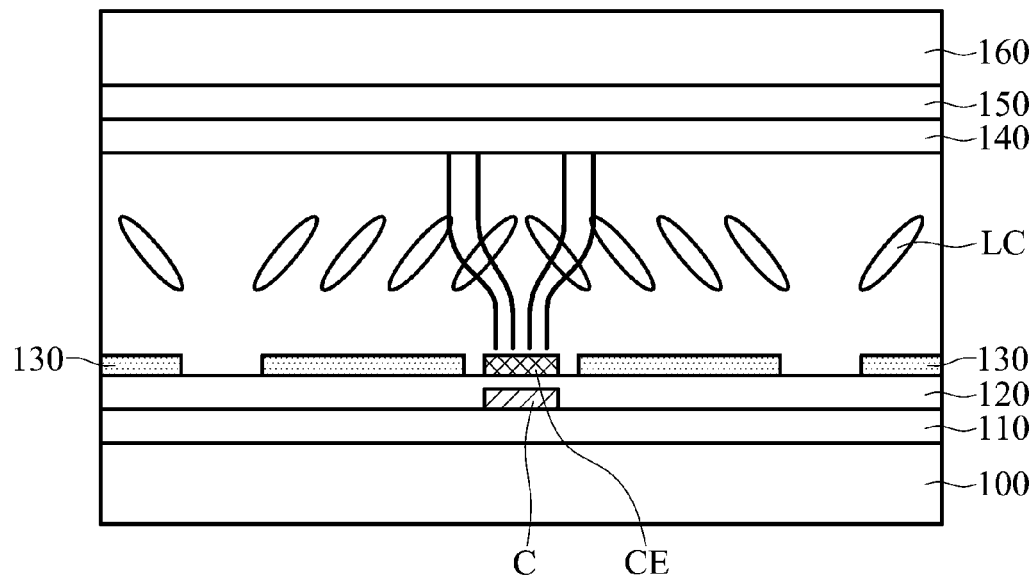
FIG. 19 is a cross section of yet another embodiment of a pixel structure of the present invention.

Shown in FIGS. 15A to 15C, the first metal layer (metal 1) M1 serves as the coupling electrode C which is exemplified, by extending from the common electrode lines, but is not limited thereto. The coupling electrode C can also not extended from the common electrode lines. The transparency conductive layer ITO can serve as the control electrode CE. Other methods can also achieve the same effects, as shown in FIGS. 18A to 18C. A Z-shaped pixel is exemplified, for the purpose of illustration, but is not limited thereto, wherein the cross section is shown in FIG. 19. A dielectric layer 110 is disposed on the lower substrate 100, and a coupling electrode C can be realized by the second metal layer (metal 2) is disposed on the dielectric layer 110. A passivation layer 120 covers on the coupling electrode C. A control electrode CE and a patterned transparent conductive layer 130 are formed on the passivation layer 120 and the control electrode CE is located on the coupling electrode C. Liquid crystal molecules LC, a transparent conductive layer 140 on the upper substrate, color filters 150, and the upper substrate 160 are sequentially disposed on the patterned transparent conductive layer 130 (i.e., the pixel electrode PE) and the control electrode CE. In other embodiment, the color filters 150 can be not formed on upper substrate 160. This pixel structure is driven by the driving signal waveforms of FIG. 11. The root mean square value of voltage differences between the control electrode CE and the common electrode of the upper substrate is substantially greater than the root mean square value of voltage differences between the pixel electrode and the common electrode of the upper substrate.

Figure 20A:
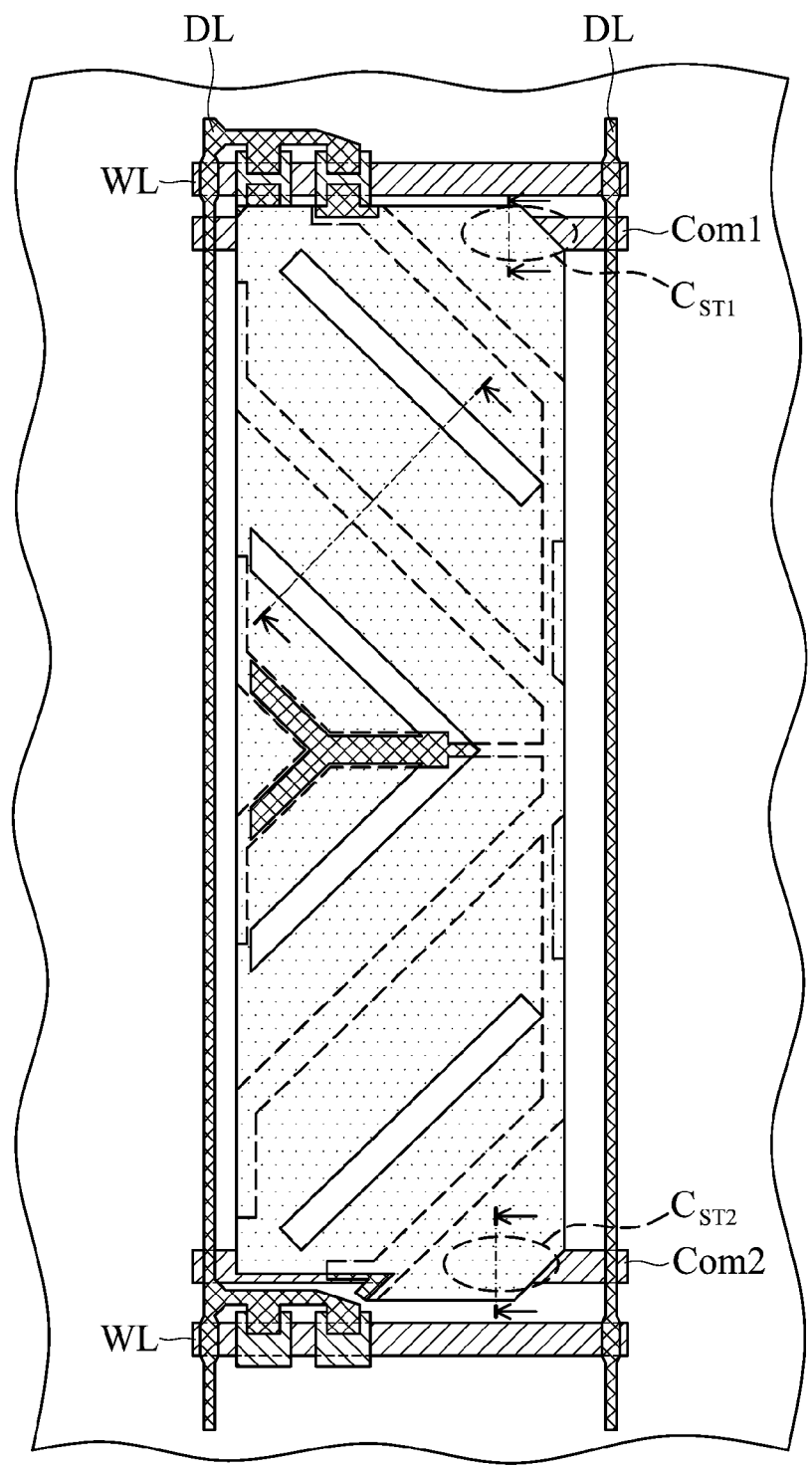
FIG. 20A is a layout of photo-masks for forming a storage capacitor between two coupling electrodes and a pixel electrode in a pixel.
Figure 20B:
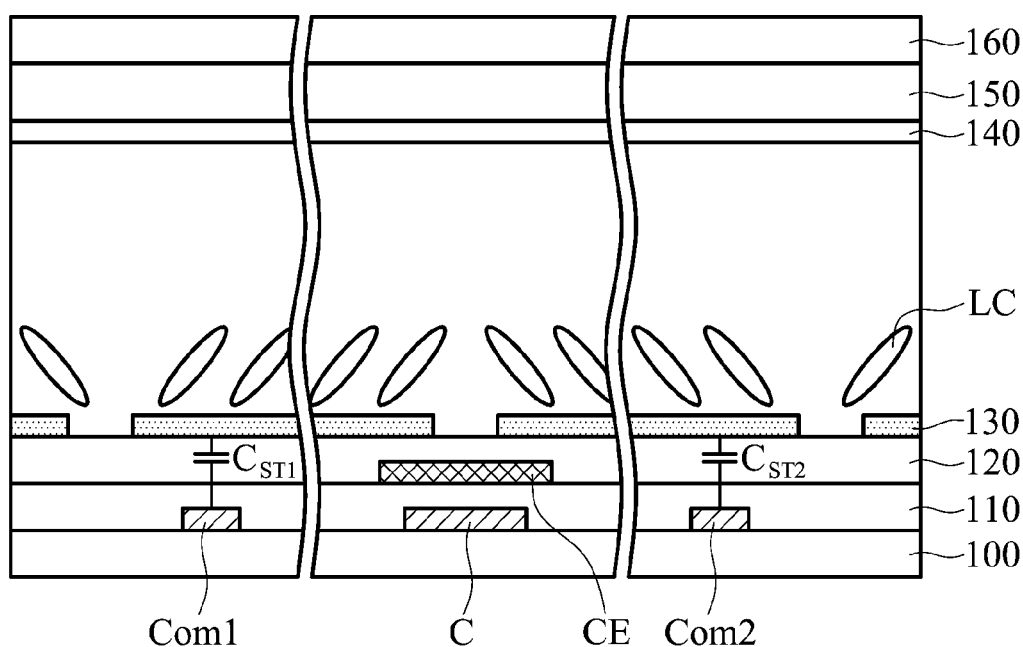
FIG. 20B and FIG. 20C, respectively, show a cross section and an equivalent circuit diagram of the pixel structure of FIG. 20A.
Figure 20C:
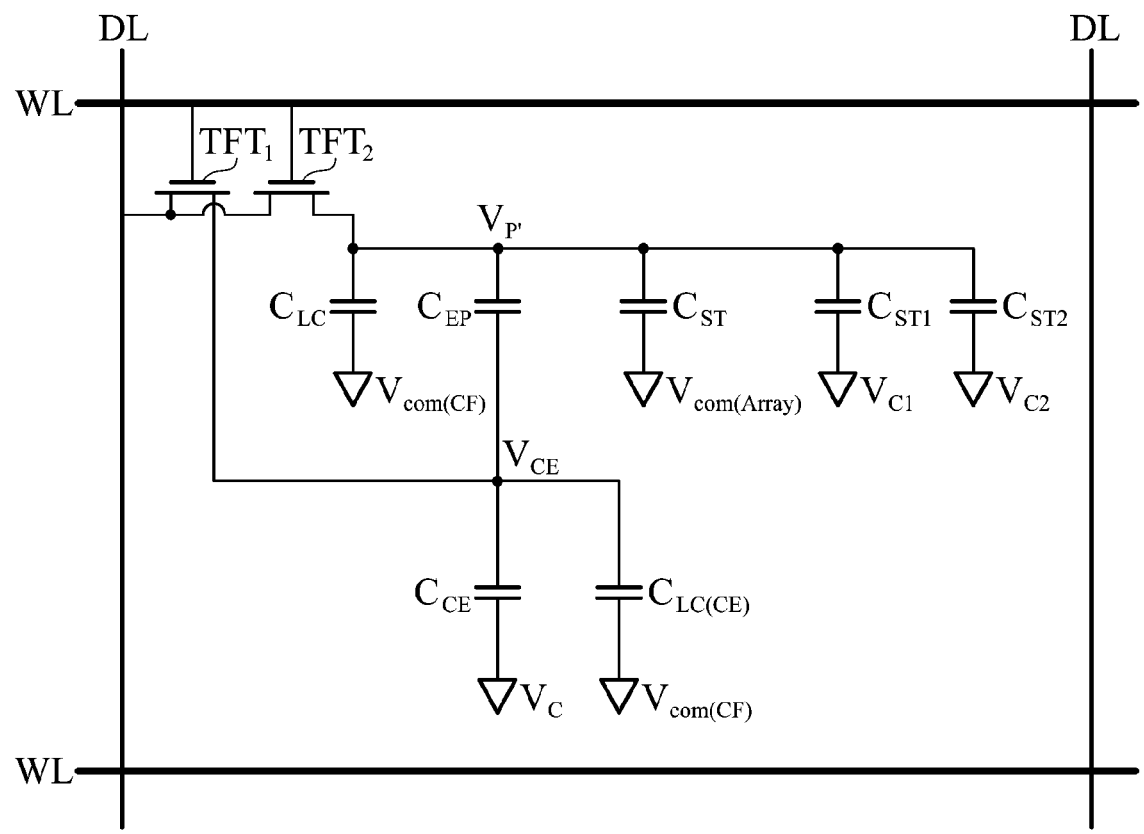

In FIG. 12A to FIG. 12E, there are two coupling electrode lines in the same pixel, and each coupling electrode line is extended from the common electrode line. In this embodiment, a coupling electrode line is exemplified, preferably connecting to substantially different coupling voltage signals, respectively, to achieve the purpose driven by dot inversion method, however, is not limited thereto. The coupling electrode lines can be connected to substantially the same coupling voltage signal, respectively. FIG. 20A shows formation of a storage capacitor between the two common electrode lines and the pixel electrode, as indicated in the dotted circle of FIG. 20A. The coupling electrode C is exemplified, by extending to one of the common electrode lines, but is not limited thereto. FIG. 20B and FIG. 20C, respectively, show a cross section and an equivalent circuit diagram of the pixel structure of FIG. 20A. By designing appropriate storage capacitors $C_{ST1}$ and $C_{ST2}$, the voltage difference coupled from the coupling electrode C to the pixel electrode PE can be controlled, thereby controlling the voltage on the pixel electrode. According this design rule, a designer can arbitrarily design voltage differences between the control electrode and the pixel electrode to prevent voltage change on the pixel electrode due to affection of the control electrode.

In the electric circuit of FIG. 20C, the voltage relationship among the control electrode $V_{CE}$, the pixel electrode Vp, and the common electrode can be shown as follows:

$$V_{CE(RMS)} = Vp + \Delta V_{CE(RMS)},$$

$$Vp' = Vp + \Delta V_{p(RMS)},$$

$$\Delta V_{C1} = \frac{V_{C1(max)} - V_{C1(min)}}{2},$$

$$\Delta V_{CE(RMS)} = \frac{\Delta V_{p(RMS)} \times C_{EP} + \Delta V_{C1} \times C_{CE}}{C_{CE} + C_{LC(CE)} + (C_{EP} // C_{LC} + C_{ST1} + C_{ST2})}, \text{ and}$$

$$\Delta V_{p(RMS)} = \frac{\Delta V_{C1} \times (C_{ST1} - C_{ST2}) + \Delta V_{CE} \times C_{EP}}{C_{LC} + C_{ST1} + C_{ST2} + (C_{EP} // (C_{CE} + C_{LC(CE)}))}.$$

Figure 21A:
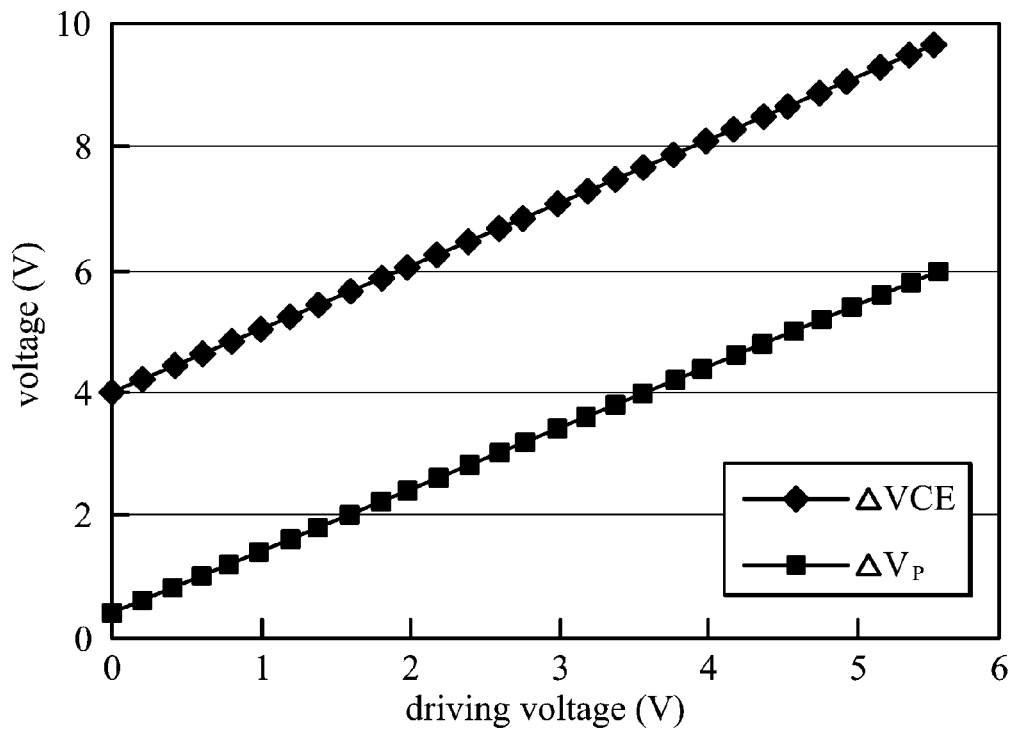
FIGS. 21A and 21B show the relationships between the control electrodes and the pixel electrodes.
Figure 21B:
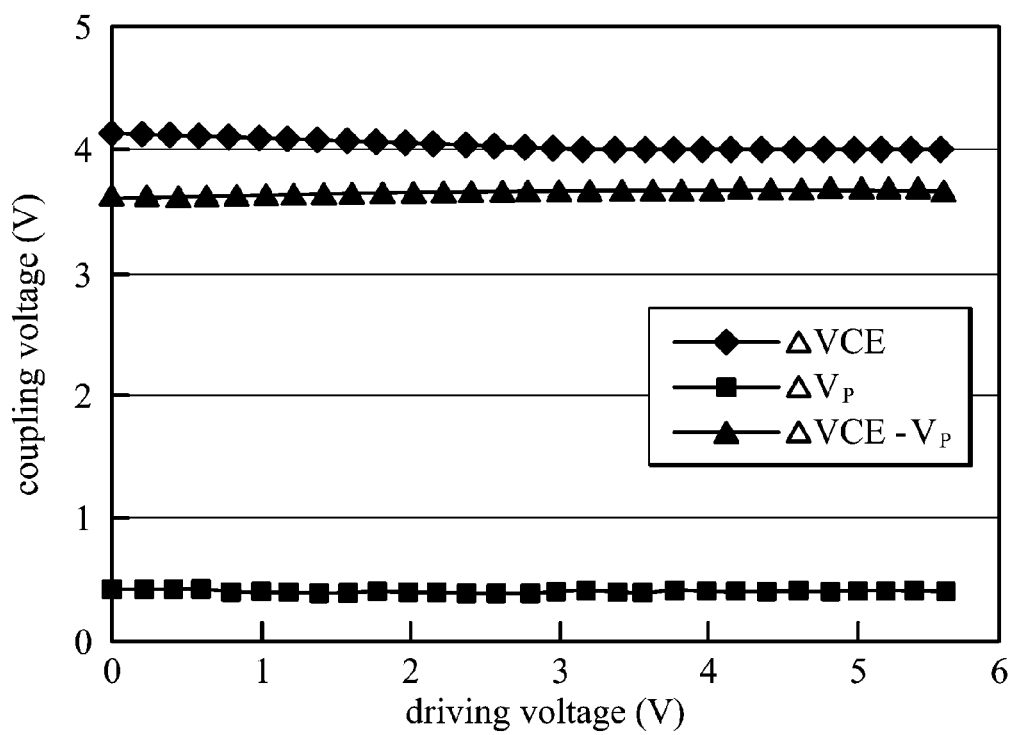

Assuming that the liquid crystal capacitor $C_{LC\_min}$ is about 0.15 pF, the coupling capacitor CEP is about 0.15 pF, $C_{CE}$ is about 0.5 pF, CLC(CE) is about 0.15 pF, the storage capacitor Cst1 is about 0.1 pF, Cst2 is about 0.02 pF, and ΔVc1 is about 5V, then the relationship between ΔVp(rms), ΔVCE(rms) and the operatic voltage is shown in FIG. 21A and FIG. 21B, respectively. No matter what driving voltages are under control, the control electrode, for example, can be stably held at about 3V or more and is substantially greater than the pixel electrode. Therefore, a voltage can exist at a dark state for liquid crystal molecules creating a pre-tilt angle in a pixel, thereby increasing response speed. At a bright state, the electric field of the control electrode can drive the liquid crystal molecules to tilt in the right indication, thereby improving stability of the display panel.

Note that if the coupling electrode of the abovementioned embodiments extends from the common electrode lines, so that signals transmitted on the coupling electrode C are substantially the same as signals transmitted on the common electrode lines as shown in FIGS. 15A to 15C, but is not limited thereto. If the coupling electrode extends from one of the common electrode lines, then signals transmitted on the coupling electrode C are also substantially the same as signals transmitted on one of the common electrode lines as shown in FIGS. 8A to 8C, FIGS. 12A to 12E, and FIGS. 20A to 20C, but is not limited thereto. That is, signals transmitted on the one of the common electrode lines (also referred as a first common electrode line) can be selectively substantially the same as or substantially different from signals transmitted on the other common electrode line (also referred as a second common electrode line). Preferably, signals transmitted on the first common electrode line are substantially inverted to signals transmitted on the second common electrode line, but is not limited thereto. In other words, if the coupling electrode extends from one of the common electrode lines (i.e., the first common electrode line), and signals transmitted thereon is substantially different from or substantially the same as signals on the other common electrode line (i.e., the second common electrode line), then signals transmitted on the coupling electrode is substantially different from or substantially the same as signals on the other common electrode line (i.e., the second common electrode line). Therefore, voltage or signals transmitted on the first common electrode line can also be referred to as a first coupling voltage, while voltage or signals transmitted on the second common electrode line can also be referred to as a second coupling voltage. In addition, embodiments of the invention are exemplified using on or two common electrode lines, however, the number of common electrode lines can be decreased or increased depending on practical design demands. For example 0 (i.e., the original number of the coupling electrode lines), one, two, three, four, five, six, seven, eight and so on may be used.

Moreover, the materials of the control electrode of the abovementioned embodiments of the invention can be substantially the same as the materials of one of the scan line, the data line, and the pixel electrode.

Figure 22:
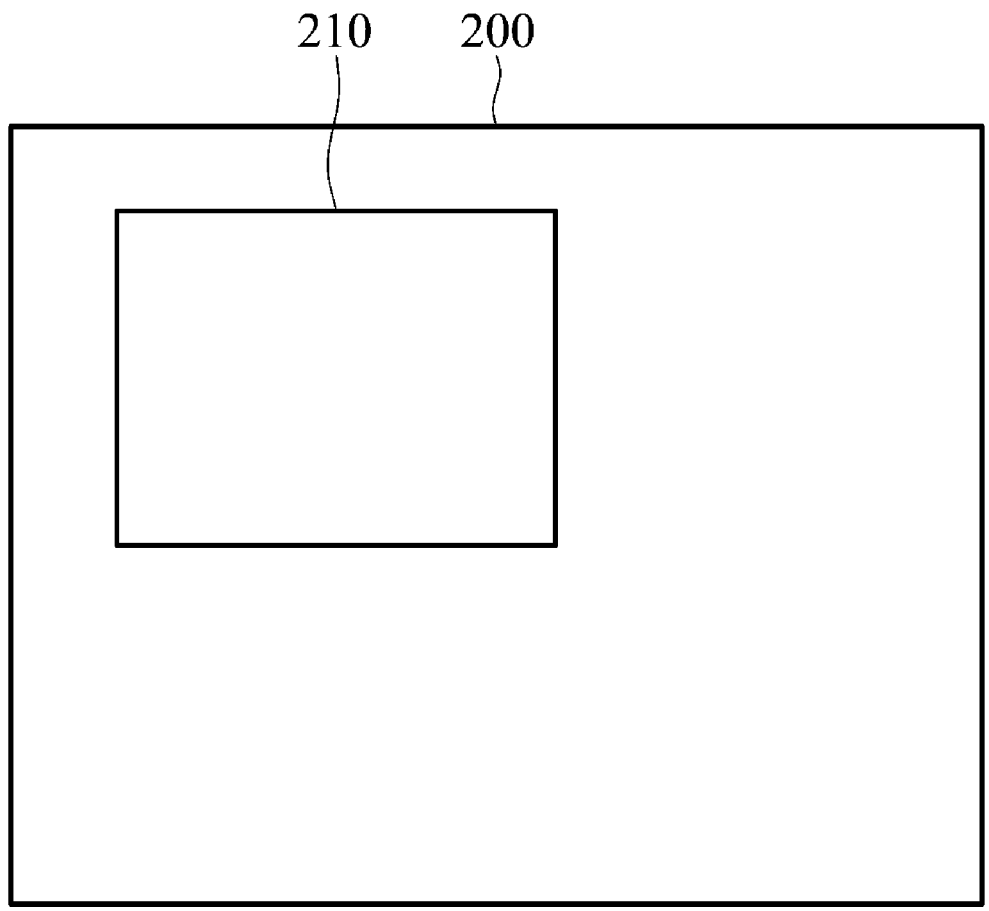
FIG. 22 is a schematic view illustrating a display device including the pixel structure described in the present invention.

FIG. 22 shows a display device 200 including the pixel structure 210 described in the invention. The display device 200 can be a liquid crystal display (LCD), an electroluminescent device (ELD), a field emission device (FED), or the likes.

Figure 23:
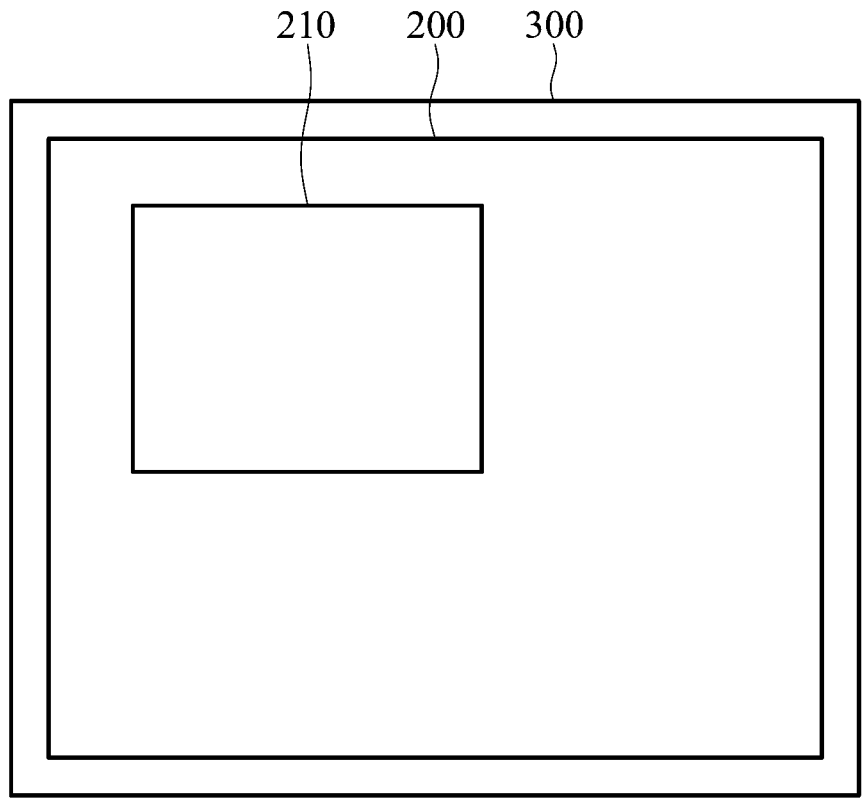
FIG. 23 is a schematic view of an electronic device including the display device of FIG. 22.

FIG. 23 shows an electronic device 300 including the display device 200 of FIG. 22. The electronic device 300 can be a notebook (NB) computer, a television (TV) monitor, a digital billboard, portable devices (such as telephones, watches, digital cameras, digital photo frames, personal digital assistants (PDA), digital AV players, game consoles), indoor/outdoor display boards, or the likes.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel structure, disposed on a first substrate, and electrically coupled to at least one scan line and at least one data line, the pixel comprising:
    a first switch device electrically coupled to the scan line and the data line;
    a second switch device electrically coupled to the scan line and the data line;
    at least one pixel electrode electrically coupled to the second switch device;
    at least one control electrode electrically coupled to the first switch element; and
    at least one coupling electrode disposed under a portion of the control electrode, wherein at least one coupling capacitor is formed by the coupling electrode and a portion of the control electrode.

2. The pixel structure of claim 1, wherein between a portion of the pixel electrode and a portion of the control electrode has at least one control capacitor.

3. The pixel structure of claim 1, further comprising at least one first common electrode line disposed under a portion of the pixel electrode.

4. The pixel structure of claim 3, wherein between a portion of the pixel electrode and a portion of the first common electrode has at least one first common capacitor.

5. The pixel structure of claim 3, further comprising at least one second common electrode line disposed under a portion of the pixel electrode.

6. The pixel structure of claim 5, wherein between the first common electrode line, the second common electrode line, and a portion of the pixel electrode respectively has at least one first common capacitor and at least one second common capacitor.

7. The pixel structure of claim 5, wherein signals separately applied on the first common electrode line and the second common electrode line are substantially different.

8. The pixel structure of claim 7, wherein the signal of the first common electrode line and the signal of the second common electrode line are substantially inverted.

9. The pixel structure of claim 5, wherein signals separately applied on the first common electrode line and the second common electrode line are substantially the same.

10. The pixel structure of claim 5, wherein signals separately applied on the second common electrode line and the coupling electrode are substantially different.

11. The pixel structure of claim 1, wherein the first switch device comprises a transistor with a gate coupled to the scan line, a source coupled to the data line, and a drain coupled to the control electrode.

12. The pixel structure of claim 1, wherein the second switch device comprises a transistor with a gate coupled to the scan line, a source coupled to the data line, and a drain coupled to the pixel electrode.

13. The pixel structure of claim 1, further comprising a second substrate opposing to the first substrate, and the second substrate comprises a common electrode.

14. The pixel structure of claim 13, wherein between the common electrode of the second substrate and a portion of the pixel electrode has at least one first capacitor.

15. The pixel structure of claim 14, wherein between the common electrode of the second substrate and a portion of the control electrode has at least one second capacitor.

16. The pixel structure of claim 13, wherein an absolute value of voltage difference between the control electrode and the common electrode is substantially different from an absolute value of voltage difference between the pixel electrode and the common electrode.

17. The pixel structure of claim 13, wherein an absolute value of voltage difference between the control electrode and the common electrode substantially greater than an absolute value of voltage difference between the pixel electrode and the common electrode.

18. The pixel structure of claim 1, wherein the material of the control electrode is substantially the same as one of the materials of the data line and the pixel electrode.

19. The pixel structure of claim 1, wherein the material of the coupling electrode is substantially the same as one of the materials of the scan line and the data line.

20. A display device comprising the pixel structure of claim 1.

21. An electronic device comprising the display device of claim 20.

22. The pixel structure of claim 1, wherein the coupling electrode does not contact to the control electrode.

23. The pixel structure of claim 1, wherein the pixel electrode does not contact to the coupling electrode.

24. The pixel structure of claim 1, wherein the pixel electrode is disposed over the control electrode, and the pixel electrode and the control electrode have a capacitor formed therebetween.

25. The pixel structure of claim 1, wherein the pixel electrode comprises a first portion and a second portion, and wherein the control electrode is interposed between the first portion and the second portion of the pixel electrode.

26. The pixel structure of claim 1, further comprising a passivation layer covering the control electrode, wherein the passivation layer is between the pixel electrode and the control electrode and has an opening exposing the control electrode.

27. A method for forming a pixel structure, the pixel structure disposed on a first substrate and electrically coupled to at least one scan line and at least one data line, the method comprising:
    forming a first switch device in the pixel structure electrically coupling to the scan line and the data line;
    forming a second switch device in the pixel structure electrically coupling to the scan line and the data line;
    forming at least one pixel electrode in the pixel structure electrically coupling to the second switch device;
    forming at least one control electrode in the pixel structure electrically coupling to the first switch element;
    forming a dielectric layer under the control electrode; and
    forming at least one coupling electrode disposed under a portion of the control electrode and the dielectric layer such that at least one coupling electrode is formed by the coupling electrode and a portion of the control electrode.

28. The method of claim 27, further comprising forming at least one first common electrode line under a portion of the pixel electrode.

29. The method of claim 28, further comprising forming at least one second common electrode line under a portion of the pixel electrode.

30. The method of claim 29, wherein signals separately applied on the first common electrode line and the second common electrode line are substantially different.

31. The method of claim 30, wherein the signal of the first common electrode line and the signal of the second common electrode line are substantially inverted.

32. The method of claim 29, wherein signals separately applied on the first common electrode line and the second common electrode line are substantially the same.

33. The method of claim 29, wherein signals separately applied on the second common electrode line and the coupling electrode are substantially different.

34. The method of claim 27, wherein the material of the control electrode is substantially the same as one of the materials of the data line and the pixel electrode.

35. The method of claim 27, wherein the material of the coupling electrode is substantially the same as one of the materials of the scan line and the data line.

36. The method of claim 27, wherein the first switch device comprises a transistor with a gate coupled to the scan line, a source coupled to the data line, and a drain coupled to the control electrode.

37. The method of claim 27, wherein the second switch device comprises a transistor with a gate coupled to the scan line, a source coupled to the data line, and a drain coupled to the pixel electrode.

38. The method of claim 27, wherein the coupling electrode does not contact to the control electrode.

39. The method of claim 27, wherein the pixel electrode does not contact to the coupling electrode.

40. The method of claim 27, wherein the pixel electrode is disposed over the control electrode, and the pixel electrode and the control electrode have a capacitor formed therebetween.

41. The method of claim 27, wherein the pixel electrode comprises a first portion and a second portion, and wherein the control electrode is interposed between the first portion and the second portion of the pixel electrode.

42. The method of claim 27, further comprising a passivation layer covering the control electrode, wherein the passivation layer is between the pixel electrode and the control electrode and has an opening exposing the control electrode.

* * * * *